(12) United States Patent
Zaphir

(10) Patent No.: US 12,185,140 B2
(45) Date of Patent: Dec. 31, 2024

(54) QUALITY DETERMINATION AND REPAIR OF WIRELESS CONNECTION TO A DEVICE

(71) Applicant: VEEGO SOFTWARE LTD., Ramat Gan (IL)

(72) Inventor: Ruth Zaphir, Netanya (IL)

(73) Assignee: VEEGO SOFTWARE LTD., Ramat Gan (IL)

( * ) Notice: Subject to any disclaimer, the term of this patent is extended or adjusted under 35 U.S.C. 154(b) by 337 days.

(21) Appl. No.: 17/713,703

(22) Filed: Apr. 5, 2022

(65) Prior Publication Data
US 2022/0330062 A1 Oct. 13, 2022

Related U.S. Application Data

(60) Provisional application No. 63/170,588, filed on Apr. 5, 2021.

(51) Int. Cl.
*H04W 24/08* (2009.01)
*H04B 17/318* (2015.01)
(Continued)

(52) U.S. Cl.
CPC .......... *H04W 24/08* (2013.01); *H04B 17/318* (2015.01); *H04L 43/0894* (2013.01); *H04L 43/55* (2022.05)

(58) Field of Classification Search
CPC . H04L 27/2601; H04L 12/189; H04L 5/0055; H04L 12/1886; H04L 5/0042; H04L 61/5069; H04L 5/00; H04L 1/1812; H04L 1/1822; H04L 1/1845; H04L 1/1864; H04L 1/1877; H04L 2001/0093; H04L 1/18; H04L 43/0894; H04L 43/55; H04L 41/147; H04L 41/5009; H04L 41/5019; H04W 28/0268; H04W 28/10; H04W 76/10; H04W 80/02; H04W 76/12; (Continued)

(56) References Cited

U.S. PATENT DOCUMENTS

| | | | |
|---|---|---|---|
| 2013/0028092 A1* | 1/2013 | Tong | H04L 47/26 370/236 |
| 2013/0275589 A1* | 10/2013 | Karthikeyan | H04L 47/125 709/224 |
| 2017/0257173 A1* | 9/2017 | Harris | H04B 10/07953 |

FOREIGN PATENT DOCUMENTS

WO WO-2014195190 A1 * 12/2014 ........... G10L 19/008

* cited by examiner

*Primary Examiner* — Nathan S Taylor
(74) *Attorney, Agent, or Firm* — The Roy Gross Law Firm, LLC; Roy Gross

(57) ABSTRACT

A computer-implemented method comprising: monitoring data traffic between an access point and an end station over a wireless link within a wireless communications network; deriving, based on the monitoring, one or more of the following quality factors associated with the wireless link: (i) a current retransmission rate quality factor over the wireless link, (ii) a current physical layer (PHY) rate quality factor of the wireless link, (iii) a current usage quality factor associated with a shared medium used by the wireless link, and (iv) a current interference quality factor associated with the shared medium; calculating, based on the derived one or more quality factors, a maximum predicted data rate associated with the wireless link; and determining an overall quality rating of the wireless link as equal to the ratio of (x) the calculated maximum predicted data rate, and (y) a maximum theoretical data rate associated with the wireless link.

17 Claims, 23 Drawing Sheets

(51) Int. Cl.
*H04L 43/0894* (2022.01)
*H04L 43/55* (2022.01)

(58) Field of Classification Search
CPC ..... H04W 28/02; H04W 80/10; H04W 76/20; H04W 4/40; H04W 4/46; H04W 4/44; H04W 40/22; H04W 40/248; H04W 40/24; H04W 4/06; H04W 16/28; H04W 28/04; H04W 28/18; H04W 72/23; H04W 72/30; H04W 72/00; H04W 72/04; H04W 24/08; B60W 60/001; B60W 60/00; G05D 1/02; G01S 5/14; G01S 5/06; H04B 17/318; H04B 17/345; H04B 17/373

See application file for complete search history.

QUALITY DETERMINATION AND REPAIR OF WIRELESS CONNECTION TO A DEVICE

CROSS REFERENCE TO RELATED APPLICATIONS

This application claims the benefit of priority of U.S. Provisional Patent Application No. 63/170,588, filed Apr. 5, 2021, the contents of which are all incorporated herein by reference in their entirety performance.

FIELD OF THE INVENTION

The invention relates to the field of monitoring digital network performance

BACKGROUND

Wireless networks have become increasingly popular in recent years. These networks are commonplace in the home, and are frequently used to provide public access in various venues, to desktop and mobile application.

In a wireless network, network data traffic capacity is limited by channel bandwidth, the transmission technology, and the communication protocols used. A wireless network is further constrained by the amount of spectrum allocated to a service area and the quality of the signal, which may suffer from channel interference or background noise, especially in a dense deployment environment, where multiple wireless networks tend to interfere with each other. This interference impacts the throughput of wireless networks and thus, the quality of service for many types of services, e.g., multimedia streaming applications.

However, in some cases, bad or slow Wi-Fi connectivity may be rooted in issues affecting the receiving device. Accordingly, correctly assessing the performance of a Wi-Fi network may require determining whether the causes of the connectivity issues are the result of transmission interferences, or rooted in device performance issues.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: monitor data traffic between an access point and an end station over a wireless link within a wireless communications network, derive, based on the monitoring, one or more of the following quality factors associated with the wireless link: (i) a current retransmission rate quality factor over the wireless link, (ii) a current physical layer (PHY) rate quality factor of the wireless link, (iii) a current usage quality factor associated with a shared medium used by the wireless link, and (iv) a current interference quality factor associated with the shared medium; calculate, based on the derived one or more quality factors, a maximum predicted data rate associated with the wireless link; and determine an overall quality rating of the wireless link as equal to the ratio between (x) the calculated maximum predicted data rate, and (y) a maximum theoretical data rate associated with the wireless link.

There is also provided, in an embodiment, a computer-implemented method comprising: monitoring data traffic between an access point and an end station over a wireless link within a wireless communications network; deriving, based on the monitoring, one or more of the following quality factors associated with the wireless link: (i) a current retransmission rate quality factor over the wireless link, (ii) a current physical layer (PHY) rate quality factor of the wireless link, (iii) a current usage quality factor associated with a shared medium used by the wireless link, and (iv) a current interference quality factor associated with the shared medium; calculating, based on the derived one or more quality factors, a maximum predicted data rate associated with the wireless link; and determining an overall quality rating of the wireless link as equal to the ratio between (x) the calculated maximum predicted data rate, and (y) a maximum theoretical data rate associated with the wireless link.

There is further provided, in an embodiment, a computer program product comprising a non-transitory computer-readable storage medium having program instructions embodied therewith, the program instructions executable by at least one hardware processor to: monitor data traffic between an access point and an end station over a wireless link within a wireless communications network, derive, based on the monitoring, one or more of the following quality factors associated with the wireless link: (i) a current retransmission rate quality factor over the wireless link, (ii) a current physical layer (PHY) rate quality factor of the wireless link, (iii) a current usage quality factor associated with a shared medium used by the wireless link, and (iv) a current interference quality factor associated with the shared medium; calculate, based on the derived one or more quality factors, a maximum predicted data rate associated with the wireless link; and determine an overall quality rating of the wireless link as equal to the ratio between (x) the calculated maximum predicted data rate, and (y) a maximum theoretical data rate associated with the wireless link.

In some embodiments, the current retransmission rate quality factor is determined based, at least in part, on a maximum expected retransmission rate associated with the wireless link, wherein the maximum expected retransmission rate is determined as a function of received signal strength (RSSI) by the end station; and the current PHY rate quality factor is determined based, at least in part, on a maximum expected PHY rate associated with the wireless link, wherein the maximum expected PHY rate is determined as a function of received signal strength (RSSI) by the end station.

In some embodiments, the current usage quality factor is determined based, at least in part, on a measure of overlapping basic service set (OBSS) load within the shared medium; and the current interference quality factor is determined based, at least in part, on a measure of interference over the shared medium.

In some embodiments, the one or more quality factors associated with the wireless link further include a failure rate quality factor which is determined based, at least in part, on a number of times that a packet is retransmitted over the wireless link without receiving an acknowledgment (ACK) message in return within a specified period of time.

In some embodiments, the maximum theoretical data rate associated with the wireless link is determined based, at least in part, on a maximum expected PHY rate associated with the wireless link, wherein the maximum expected PHY rate is determined as a function of received signal strength (RSSI) by the end station.

In some embodiments, the program instructions are further executable to determine, and the method further comprises determining, an operational status of the wireless link based, at least in part, on the overall quality rating relative to a predetermined threshold.

In some embodiments, the program instructions are further executable to determine, and the method further comprises determining, a cause of the operational status as one of the end station or and the wireless link, based, at least in part, on the relative values of the one or more quality factors.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
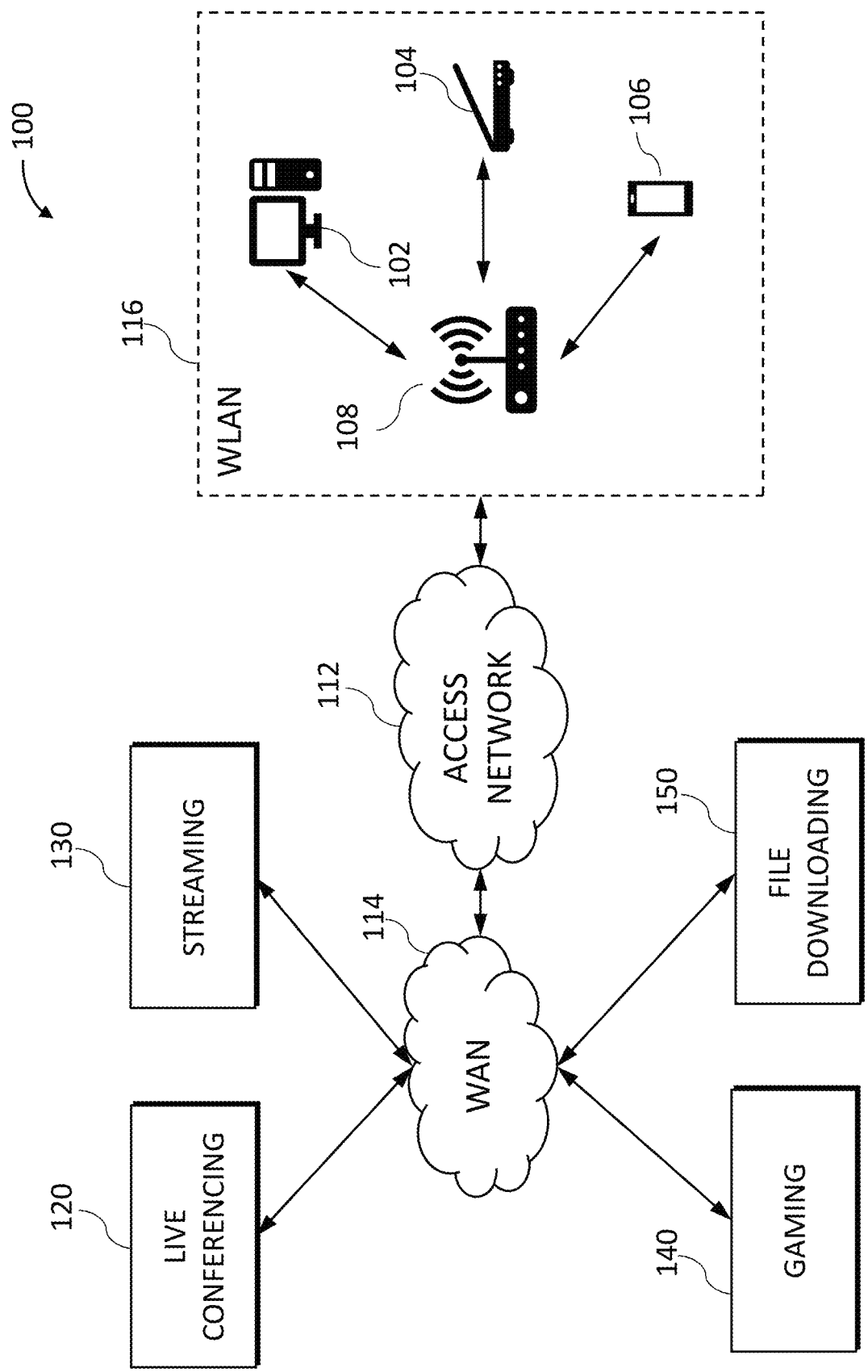
FIGS. 1A-1B illustrate an exemplary network environment in which the present technique for monitoring and evaluating the quality of a wireless link between an access point and an end station (e.g., an end-device) within a wireless communications network may be employed, according to some embodiments of the present disclosure.

Disclosed herein is a technique, embodied in a system, method and computer program product, which provides for monitoring and evaluating the quality of a wireless link between an access point or gateway and an end station (e.g., an end-device) within a wireless communications network, e.g., a wireless local area network (WLAN), such as a home Wi-Fi network.

In the present context, wireless link quality may be defined to reflect the level of performance of the wireless link provided to an end-device, measured by a ratio between a maximum actual predicted bitrate of the link and its maximum theoretical bitrate as may be measured over optimal transmission conditions.

Embodiments described herein are directed to approaches for determining and enhancing a quality of experience (QoE) of users of end-devices executing wireless applications, such as web browsers, music and/or video streaming, live conferencing, social networking platforms, email applications, or the like. The end-devices may utilize the wireless communications capability of the device to exchange data with various network devices (e.g., servers, other devices, etc.) over a data traffic network.

Embodiments described herein provide for determining a source of performance issues affecting a wireless connection within a data traffic network, e.g., whether a source of a connectivity issue is poor wireless link performance or the performance of the affected device itself. In some embodiments, the present disclosure provides for a software agent to be deployed within, e.g., a control node of a data traffic network (such as an access point of the data traffic network), wherein the software agent provides for the detection of connectivity problems within the data traffic network, as well as for automated repair of such connectivity problems and/or issuing repair notification and/or recommendations to a user and/or to an internet service provider (ISP) technical support and/or customer care functions.

Wireless communications systems or networks are widely used to enable many types of communication content, e.g., voice, video, packet data, messaging, broadcast, online gaming, or the like. These networks may be multiple-access networks capable of supporting communication with multiple users over a shared medium. A wireless data traffic network, such as a Wi-Fi (e.g., IEEE 802.11) network, may include an access point (AP) that may communicate with one or more end stations (STA) (e.g., end-devices). The AP may be coupled to a wide-area network, such as the Internet, and may enable an end-device to communicate via the network (or communicate with other devices coupled to the AP). A wireless device may communicate with a network device bi-directionally. For example, within a data traffic network, an STA may communicate with an associated AP via downlink (DL) and uplink (UL).

Wi-Fi networks operating under the IEEE 802.11 family of standards typically support the 5 GHz and 2.4 GHz frequency bands. In each frequency band, there are a specified number of orthogonal channels. However, due to the limited number of channels in each band, new APs deployed in an environment sometimes have to coexist with another AP using the same channels. This causes co-channel interference in the occupied channel, and overlapping interference with adjacent channels. A considerable interference among neighboring APs can cause degradation in downlink data throughput.

The inherent variability in the quality of service (QoS) achieved by various wireless end-devices drives many complaints to network internet service providers (ISPs). Moreover, many service disruptions (and the resulting service calls to ISP helplines) arise within the final network segment (e.g., the home network), which is invisible and largely beyond the control of the ISPs. For example, one of the major causes of poor QoS in the home is disruptions in the network's ability to deliver packets to an end-device. Poor quality of experience from a connected device may be caused by a variety of factors, such as devices being too far from a wireless router or access point (AP), the router or AP being turned off or not working properly, the router or AP itself receiving poor service from the external network, interference from other equipment within the environment, or authentication issues between networked devices and the router or AP. In some cases, connectivity issues may be caused by performance issues of an end-devices itself, e.g., when the device operates with a slow connection or fails to repair a connection.

Accordingly, the quality of service within a data traffic network may be affected by a host of issues, including, but not limited to:
- Device or service disconnections,
- coverage issues (e.g., weak signal causes connectivity issues in some physical locations),
- bandwidth (BW) issues,
- access point (AP) saturation,
- service disruptions in, e.g., online gaming, video streaming, internet browsing, live conferencing (video or voice), In some embodiments, the present disclosure provides for a technique, embodied in a system, method and computer program product, for determining a quality parameter of a wireless link provided to an end-device within a wireless data traffic network, and for identifying any issues affecting such wireless link. In some embodiments, the present technique may further provide for automated repair of connectivity issues affecting a wireless link provided to an end-device within a wireless data traffic network, e.g., by effecting an alternate wireless link based on available channel network channels; by steering an end-device towards using the higher 5 GHz band; by enabling an Airtime Fairness functionality or protocol within an access point (AP) of the wireless network; by re-configuring an AP of the wireless network, e.g., when operating in mixed-mode; and/or by effecting a reset of a wireless connection on an end-device, in case of a device with a slow connection when the device is in a so-called 'sticky rate' which forces the client to repeat its retransmissions while the AP is not able to receive its packets.

In some embodiments, the present technique may further issue appropriate notifications, e.g., to an ISP monitoring center and/or a customer care center, regarding the status of a wireless link provided to an end-device within a wireless data traffic network serviced by the ISP, any repair attempts that were undertaken, and potential further solutions which may be effected by the ISP and/or proposed to a user to resolve any lingering issues.

In some embodiments, the present technique may further issue appropriate notification and/or recommendations to a user using an end-device, when it is determined that the connectivity issues affecting a wireless link provided to the end-device are related in whole or part to the performance of the device itself. For example, such notifications and/or recommendations may include restarting or resetting the device, disabling a smart scanning functionality of the device, disabling a Bluetooth (BT) connectivity of the device, and the like.

In some embodiments, determining a quality parameter of a wireless link provided to an end-device within a wireless data traffic network may be based, at least in part, on determining one or more of the following wireless link parameters associated with a wireless link provided to an end-device within a wireless data traffic network:
- Link quality metrics,
- link capability and/or capacity metrics,
- link maximum theoretical bitrate,
- link maximum actual predicted bitrate,
- link events,
- AP-related quality metrics,
- wireless channel metrics, and/or
- AP wireless shared medium (air) metrics.

In some embodiments, the present disclosure provides for monitoring and measuring a plurality of a wireless link parameters to determine a quality rating of a wireless link, wherein these parameters may be obtained by monitoring various wireless link layers, including, but not limited to:
- Data link layer metrics, e.g., retransmissions, failures, and/or signal strength;
- data link layer events, such as authentication failures, association/di-association, ADDBA requests, etc;
- data link and physical layer metrics such as channel bandwidth, standard, channel utilization, channel bitrate; and/or
- Clear Channel Assessment (CCA) metrics for current channel in use as well as for other available channels in the WLAN spectrum, e.g., channel load, channel interference, channel background noise, etc.

In some embodiments, the present technique provides for assigning a wireless link quality rating based, at least in part, on the wireless link parameters, wherein the wireless link quality rating is measured as the ratio between a maximum actual predicted bitrate of the link and its maximum theoretical bitrate as may be measured over optimal transmission conditions.

In some embodiments, a quality rating of a wireless link may be used to assess an overall Quality of Experience (QoE) associated with the wireless link, as one of:
- Satisfactory Status: The wireless link provides good QoE.
- Advisory Status: The wireless link currently provides good QoE, however, the QoE is unstable and may be negatively impacted in the case of an increase in network data traffic.
- Critical Status: The wireless link provides inadequate QoE.
- Inoperative Status: The wireless link is inoperative, such that an end-deice is unable to connect to an AP within the network, an end-device experiences frequent disconnections, and/or an end-device is unable to execute applications which require a real-time data connection, e.g., live conferencing or online gaming.

In some embodiments, the overall QoE assessment may be further based, at least in part, on the following wireless link state measures:

Saturated Link: Defined as inability to increase channel bitrate due to factors other than wireless link quality, e.g., the end-device has either reached its maximum capacity, the AP is overloaded by its clients, or some far client is starving near clients.

Unstable Link: Defined based on the frequency of a wireless link disconnections experienced by an end-device.

Weak Link: Defined as an end-device experiencing poor link performance due to low signal strength.

Slow Link: Defined as a wireless link having a predicted actual bitrate that is below a predetermined threshold.

In a non-limiting example, the present technique may operate within the context of a wireless local area network (WLAN) comprising one or more end-devices, e.g., end stations (STAs). A WLAN may be connected to the Internet through a wireless access point (AP) and/or a gateway, such as a broadband modem and/or router. In a typical WLAN environment, a user may access the Internet by connecting a wireless client or end-device to a server on the Internet, via intermediate devices and networks. In some implementations, an end-device may be connected to a WLAN configured to communicate with servers on a wide area network (e.g., the Internet) via an access network. In some embodiments, STAs within a WLAN can be, but are not limited to, a tablet, a desktop computer, a laptop computer, a handheld computer, a cellular telephone, a smartphone, a network appliance, a camera, a media player, a navigation device, a game console, or a combination of any these data processing devices or other data processing devices. WLANs of the present disclosure may include a computer network that covers a limited geographic area (e.g., a home, school, computer laboratory, an office building) using a wireless distribution method. Home gateways and APs, as described herein, may perform many of the interfacing functions between the home network and an ISP's network. In a large number of cases, the role of the home gateway is combined with that of a wireless AP.

Figure 1B:
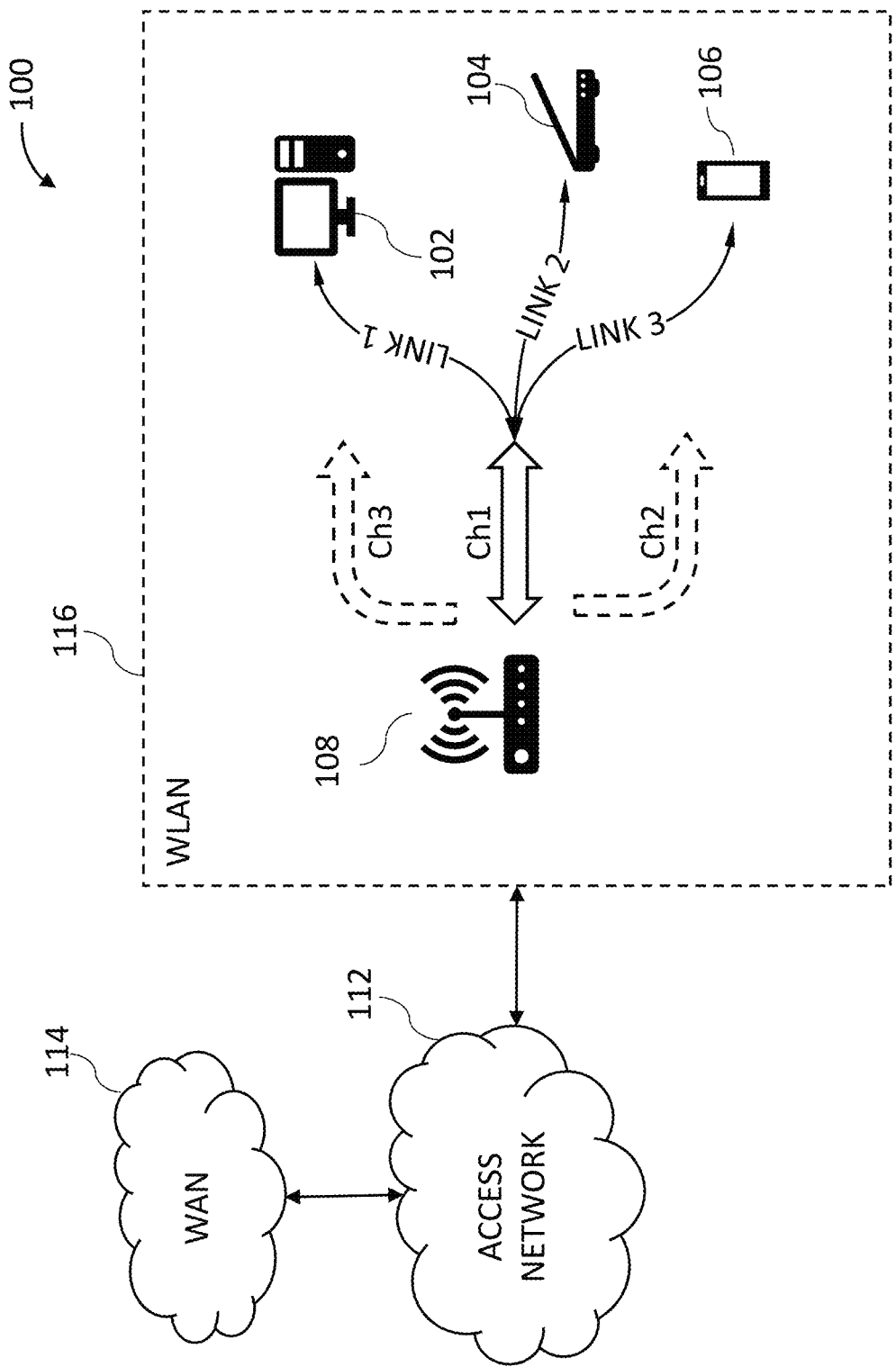

FIGS. 1A-1B illustrate an exemplary network environment 200 in which the present technique for monitoring and evaluating the quality of a wireless link between an access point and an end station (e.g., an end-device) within a wireless communications network, may be employed, according to some embodiments of the present disclosure.

Network environment 200 includes STAs 102, 104 and 106 communicably connected to remote servers 120-150 via WLAN 116, access network 112 and wide area network 114. WLAN 116 includes AP 108 and STAs 102-106. WLAN 116 may be connected with the access network via a broadband modem.

WLAN 116 can include, but is not limited to, a computer network that covers a limited geographic area (e.g., a home, school, computer laboratory, or office building) using a wireless (WLAN) distribution method. Client devices (e.g., STAs 102-106) may associate with an AP (e.g., AP 108) to access WLAN 116 using Wi-Fi standards.

For exemplary purposes, WLAN 116 is illustrated as including multiple STAs 102-106; however, WLAN 116 may include only one of STAs 102-106. In some implementations, WLAN 116 may be, or may include, one or more of a bus network, a star network, a ring network, a relay network, a mesh network, a star-bus network, a tree or hierarchical network, and the like.

AP 108 can include a network-connectable device, such as a hub, a router, a switch, a bridge, or an AP. The network-connectable device may also be a combination of devices, such as a Wi-Fi router that can include a combination of a router, a switch, and an AP. Other network-connectable devices can also be utilized in implementations of the subject technology. AP 108 can allow client devices (e.g., STAs 102-106) to connect to wide area network 114 via access network 112.

The primary function of AP 108 is to provide wireless access to STAs 102-106. Hence, AP 108 includes functions commonly found in an access point such as periodically broadcasting a beacon indicating the identity of the access point. Further, AP 108 is operable to associate with one or more STAs 102-106 in order to transmit data between the STAs 102-106 and a wired network via a communications link on an active channel (e.g., Links 1-3 over Ch1 in FIG. 1B). Communications with STAs 102-106 are typically executed on only one active channel at a time, although the access point could be configured to support multiple active channels. In order to reduce the likelihood of collisions in communications, STAs 102-106 may transmit short request to send ("RTS") packets to AP 108, and then begin data transmission only upon receipt of a clear to send ("CTS") packet transmitted by AP 108 in response to the RTS, i.e., a CTS that specifically identifies the end-device.

Each of STAs 102-106 can represent various forms of computing devices, e.g., a desktop computer, a laptop computer, a handheld computer, a tablet, a cellular telephone, a smartphone, a network appliance, a camera, a media player, a navigation device, a gaming console, or a combination of any these devices.

In some aspects, STAs 102-106 may communicate through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA3000, or General Packet Radio System (GPRS), among others. For example, the communication may occur through a radio-frequency transceiver (not shown). In addition, short-range communication may occur, for example, using a Bluetooth, Wi-Fi, or other such transceiver.

Each of remote servers 120-150 may be a system or device having a processor, a memory, and communications capability for providing content and/or services to the STAs in one of a plurality of service categories, e.g. media streaming, text messaging, voice over IP applications, email, database access, file sharing, online gaming, etc. In some example aspects, each of remote servers 120-150 can be a single computing device, for example, a computer server. In other embodiments, each of remote servers 120-150 can represent more than one computing device working together to perform the actions of a server computer (e.g., cloud computing). Further, each of remote servers 120-150 can represent various forms of servers including, but not limited to an application server, a proxy server, a network server, an authentication server, an electronic messaging server, a content server, a server farm, etc., accessible to STAs 102-106. For example, remote server 120 may be an internet service provider server that provides services for accessing and/or using wide area network 114. For example, remote server 130 may be a web server that delivers web content accessible through wide area network 114.

A user may interact with the content and/or services provided by remote servers 120-150 through a client application installed at STAs 102-106. Alternatively, the user may interact with the system through a web browser application at STAs 102-106. Communication between STAs 102-106 and remote servers 120-150 may be facilitated through WLAN 116, access network 112 and/or wide area network 114.

Access network 112 can include, but is not limited to, a cable access network, public switched telephone network, and/or fiber optics network to connect wide area network 114 to WLAN 116. Access network 112 may provide last mile access to internet. Access network 112 may include one or more routers, switches, splitters, combiners, termination systems, central offices for providing broadband services.

Wide area network 114 can include, but is not limited to, a large computer network that covers a broad area (e.g., across metropolitan, regional, national or international boundaries), for example, the Internet, a private network, a cellular network, or a combination thereof connecting any number of mobile clients, fixed clients, and servers. Further, wide area network 114 can include, but is not limited to, any of the following network topologies, including a bus network, a star network, a ring network, a mesh network, a star-bus network, tree or hierarchical network, and the like. Wide area network 114 may include one or more wired or wireless network devices that facilitate device communications between STAs 102-106 and severs 120-150, such as switch devices, router devices, relay devices, etc., and/or may include one or more servers.

FIG. 1B shows WLAN 116 wherein AP 108 operates 3 wireless channels (marked Ch1, Ch2, Ch3) within a band of channels, e.g., 5 GHz or 2.4 GHz. In practice, AP 108 may operate fewer or more channels, e.g., up to 23 channels or more channels in the 5 GHz band. In some embodiments, AP 108 may be configured to wirelessly communicate in a specific channel, e.g., the home channel, with one or more STAs 102-106, wherein each of STAs 102-106 is assigned a separate data connection or link over the specific channel, e.g., Links 1-3. As shown in FIG. 1B, AP 108 is in communication with STAs 102-106 over data links, e.g., Links 1-3, which are provided via home channel Ch1. The configuration shown in FIG. 1B is for exemplary purposes only, and in practice AP 108 or a similar device may provide wireless links or links to one or more end-devices over any one or more available channels. In the illustrated example in FIG. 1B, which is simplified to facilitate understanding of the invention, AP 108 supports 3 channels: Ch1-Ch3. Ch1 is the active channel, and Ch 2 and Ch3 are alternate channels which are supported but not presently active. In some embodiments, the present technique provides for determining a quality rating of a wireless link (e.g., Links 1,2, and/or 3 shown in FIG. 1B), provided to corresponding end-devices (e.g., STAs 102-106) within a wireless data traffic network (e.g., WLAN 116), and for identifying any issues affecting such wireless link.

Figure 2:
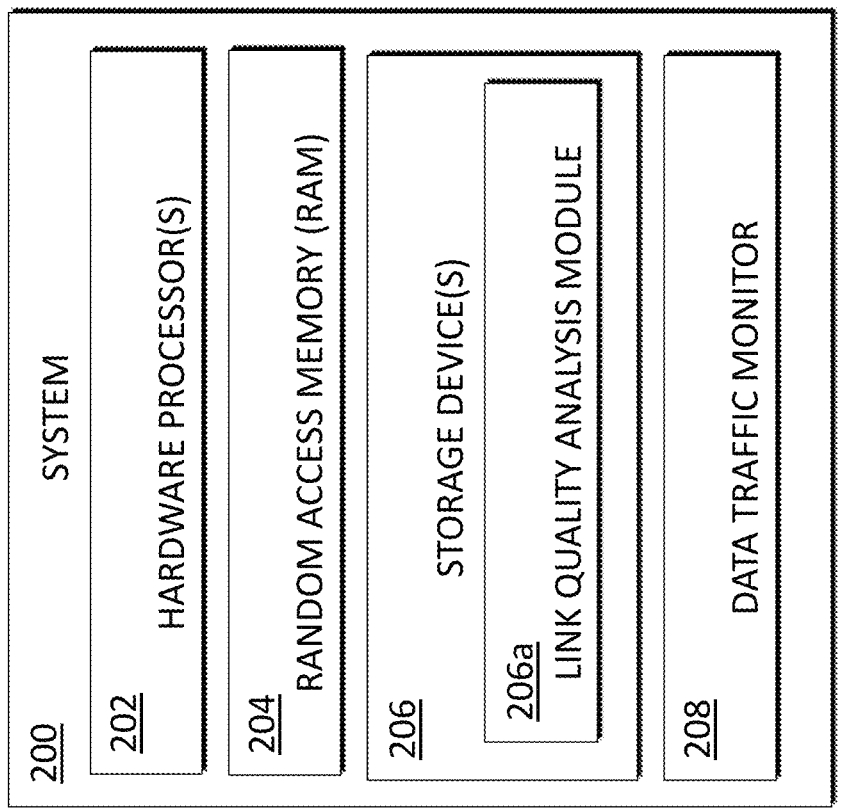
FIG. 2 is a block diagram of an exemplary system for determining a quality rating of a wireless link provided to corresponding end-devices within a wireless data traffic network and for identifying any issues affecting such wireless link, according to some embodiments of the present disclosure.

FIG. 2 is a block diagram of an exemplary system 200 for determining a quality rating of a wireless link (e.g., Links 1,2, and/or 3 shown in FIG. 1B), provided to corresponding end-devices (e.g., STAs 102-106) within a wireless data traffic network (e.g., WLAN 116), and for identifying any issues affecting such wireless link.

System 200 may include one or more hardware processor(s) 202, a random-access memory (RAM) 204, one or more non-transitory computer-readable storage device(s) 206, and a data traffic monitor 208. Storage device(s) 206 may have stored thereon program instructions and/or components configured to operate hardware processor(s) 202. The program instructions may include one or more software modules, such as link quality analysis module 206*a*. The software components and modules may include an operating system having various software components and/or drivers for controlling and managing general system tasks (e.g., memory management, storage device control, power management, etc.), and facilitating communication between various hardware and software components. System 200 may operate by loading instructions of the various software modules into RAM 204 as they are being executed by processor(s) 202.

Data traffic monitor 208 may be configured to continuously monitor one or more data traffic links over a data communication network, e.g., WLAN 116 shown in FIGS. 1A-1B. In some embodiments, data traffic monitor 208 may be configured to perform the function of continuous and/or periodic background scanning of available alternate channels within WLAN 116, e.g., Ch2 and Ch3 in FIG. 1B, of the finite number of channels supported by AP 108 in the predetermined spectrum. Data traffic monitor 208 may monitor and collect information such as data packets, user data, or control information associated with various information channels (e.g., control channels, data channels, and information related to managing service discovery over network connections). Information received at data traffic monitor 208 may be processed and transmitted to link quality analysis module 206*a* and/or to other components of system 200. In some examples, data traffic monitor 208 may include a circuit or circuitry for monitoring and identifying one or more attributes of a connection. In some embodiments, data traffic monitor 208 may be configured to monitor and determine, e.g., connection throughput (e.g., connection bitrate, packets per second, etc.). In some embodiments, data traffic monitor 208 may comprise a 'sniffer' or network analyzer designed to capture packet data on a network. In some embodiments, data traffic monitor 208 may employ any suitable hardware and/or software tool to capture data traffic samples. For example, data traffic monitor 208 may be deployed to monitor one or more access networks, access points, end-devices, and/or hosts, to collect data packets sent to or received from the internet. In some embodiments, data traffic monitor 208 may be configured to determine a corresponding source or application associated with each collected data packet. In some embodiments, data traffic monitor 208 may be configured to timestamp each received packet, and to label each received packet with its associated source or application.

In some embodiments, data traffic monitor 208 may be completely software based, hardware based, or a combination of both. Data traffic monitor 208 may comprise one or more monitoring points, which may be implemented in software and/or hardware devices distributed over a plurality of networks. In some cases, data traffic monitor 208 may be implemented by a vendor, such as an ISP, to monitor network data traffic over a backbone or access network, where the data traffic is associated with a plurality of LANs serviced by the ISP.

In some embodiments, link quality analysis module 206*a* may be configured to receive network data traffic and to preprocess and/or process and analyze the data according to any desirable or suitable analysis technique, procedure or algorithm. In some embodiments, link quality analysis module 206*a* may be configured to perform any one or more of the following: data cleaning, data filtering, data normalizing, and/or feature extraction and calculation.

System 200 as described herein is only an exemplary embodiment of the present invention, and in practice may be implemented in hardware only, software only, or a combination of both hardware and software. In various embodiments, system 200 may comprise a dedicated hardware device, or may be implement as a hardware and/or software module into an existing device, e.g., an AP, such as AP 208 within WLAN 216 shown in FIGS. 1A-1B, or may be part of a remote server, e.g., remote servers 120-150 shown in FIGS. 1A-1B. System 200 may have more or fewer components and modules than shown, may combine two or more of the components, or may have a different configuration or arrangement of the components. System 200 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 200 may be co-located or distributed, or the system may be configured to run as one or more cloud computing 'instances,' 'containers,' machines,' or other types of encapsulated software applications, as known in the art. As one example, system 200 may in fact be realized by two separate but similar systems. These two systems may cooperate, such as by transmitting data from one system to the other (over a local area network, a wide area network, etc.), so as to use the output of one module as input to the other module.

Figure 3A:
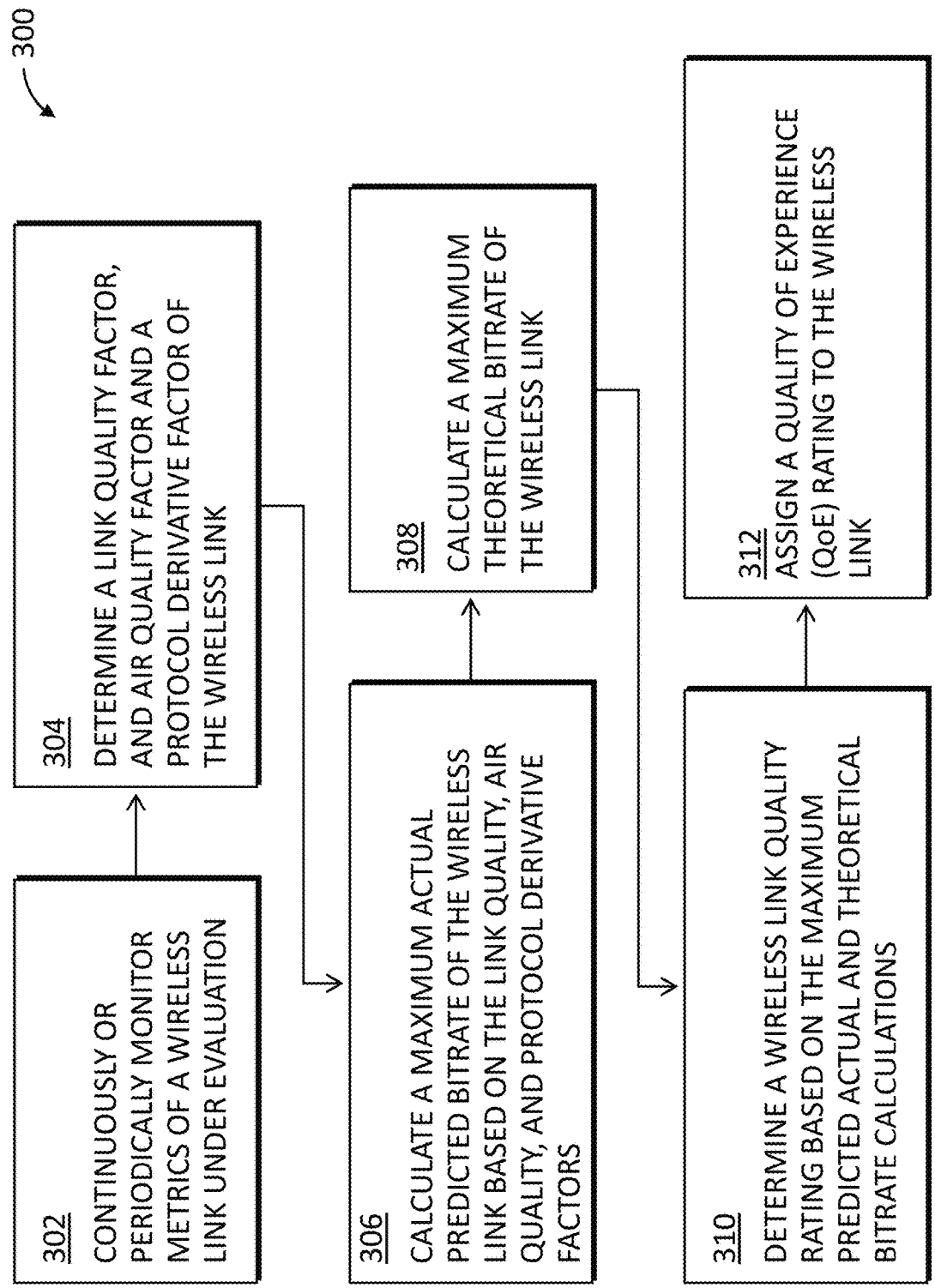
FIG. 3A is a flowchart which illustrates the functional steps in a method for monitoring and evaluating the quality of a wireless link between an access point and an end station within a wireless communications network, according to some embodiments of the present disclosure.

The instructions of system 200 will now be discussed with reference to the flowchart of FIG. 3A, which illustrates the functional steps in a method 300 for monitoring and evaluating the quality of a wireless link under evaluation within a wireless communications network, e.g., a wireless local area network (WLAN), such as a home Wi-Fi network, in accordance with various aspects of the present disclosure; and with reference to FIGS. 3B-3D, which are schematic diagrams illustrating the various components in determining a quality of a wireless link under evaluation within a WLAN, according to some embodiments of the present disclosure.

The various steps of method 300 may either be performed in the order they are presented or in a different order (or even in parallel), as long as the order allows for a necessary input to a certain step to be obtained from an output of an earlier step. In addition, the steps of method 300 may be performed automatically (e.g., by system 200 of FIG. 2 within an exemplary environment such as the one depicted in FIG. 1A-1B), unless specifically stated otherwise.

In some embodiments, method 300 provides for monitoring and evaluating a quality of a wireless link under evaluation within a WLAN, such as any one of Links 1-3 illustrated in FIG. 1B. In some embodiments, the quality of a wireless link reflects the level of performance of the wireless link between an STA (e.g., a client or end-device) and an AP.

In some embodiments step 302, the instructions of data traffic monitor 208 may cause system 200 to monitor and collect wireless link metrics regarding first wireless link within a wireless network, e.g., Link 1 in WLAN 116 shown in FIG. 1B. In some embodiments, data traffic monitor 208 may be configured to monitor and capture link metrics from one or more interface points associated with the wireless network.

In some embodiments, data traffic monitor 208 may be configured to monitor at least the following metrics:
Physical layer rate which relates to the transfer rate on the physical layer of the wireless link;
wireless link retransmissions and failures;
signal strength;
link bitrate;
wireless link events, including authentication failure, disassociation, ADD BA session;
channel metrics, including transmission protocol, bandwidth, channel utilization, bitrate;
Clear Channel Assessment (CCA), including status, load, interferences, background noise, which may be performed for each channel in the current Wi-Fi spectrum.

In step 304, the instructions of link quality analysis module 206a may cause system 200 to calculate one or more parameters or factors representing a quality of the wireless link under evaluation. In some embodiments, such parameters or factors include on one or more of the following:
Link Quality Factor: A measure of a quality of a wireless link as may be reflected in one or more of received signal strength (RSSI), retransmission rates, timeout rates, data packet error rates, and/or maximum physical layer (PHY) data rate.
Air Quality Factor: A measure of a quality of the wireless link shared medium, as may be reflected in one or more of background noise, background interferences, and/or channel load.
Channel load represents a percentage of the channel usage in time (or busy time) with respect to the total channel measurement time (e.g., total busy and idle time).
Interferences are defined as the communication deterioration caused by background signals in a physical channel, which interfere with the communications between an AP and its STAs.
Protocol Derivative Factor: A measure of Wi-Fi protocol-related use of mechanisms which may affect link quality such as:
Using request to send ("RTS") and clear to send ("CTS") packets between AP and STA, when the AP is operating in mixed mode, to avoid data collision between STAs within the WLAN.
Co-existing of, e.g., 20, 40 and/or 80 MHz clients within a Wi-Fi service set that may require a protection mechanism, such as RTS/CTS.
Using the block acknowledgement (BA) mechanism to send aggregated media access control protocol data unit (MPDU) packets.

The present technique is based on the insight that wireless link quality may be affected by two determined factors: the Link Quality Factor, which reflects the rate of packet transmission between a transmitter in a WLAN (e.g., an AP) and an STA within a given transmission shared medium, and the Air Quality Factor which reflects the quality of and issues affecting the shared medium or transmission medium within a wireless environment.

In some embodiments, each of the Link Quality Factor and the Air Quality Factor may be expressed as a normalized value, e.g., between 0-100, denoting relevant attributes of the wireless link in relative terms. These factors shall now be explained in detail below.

Wireless Link Quality Factor

Figure 3B:
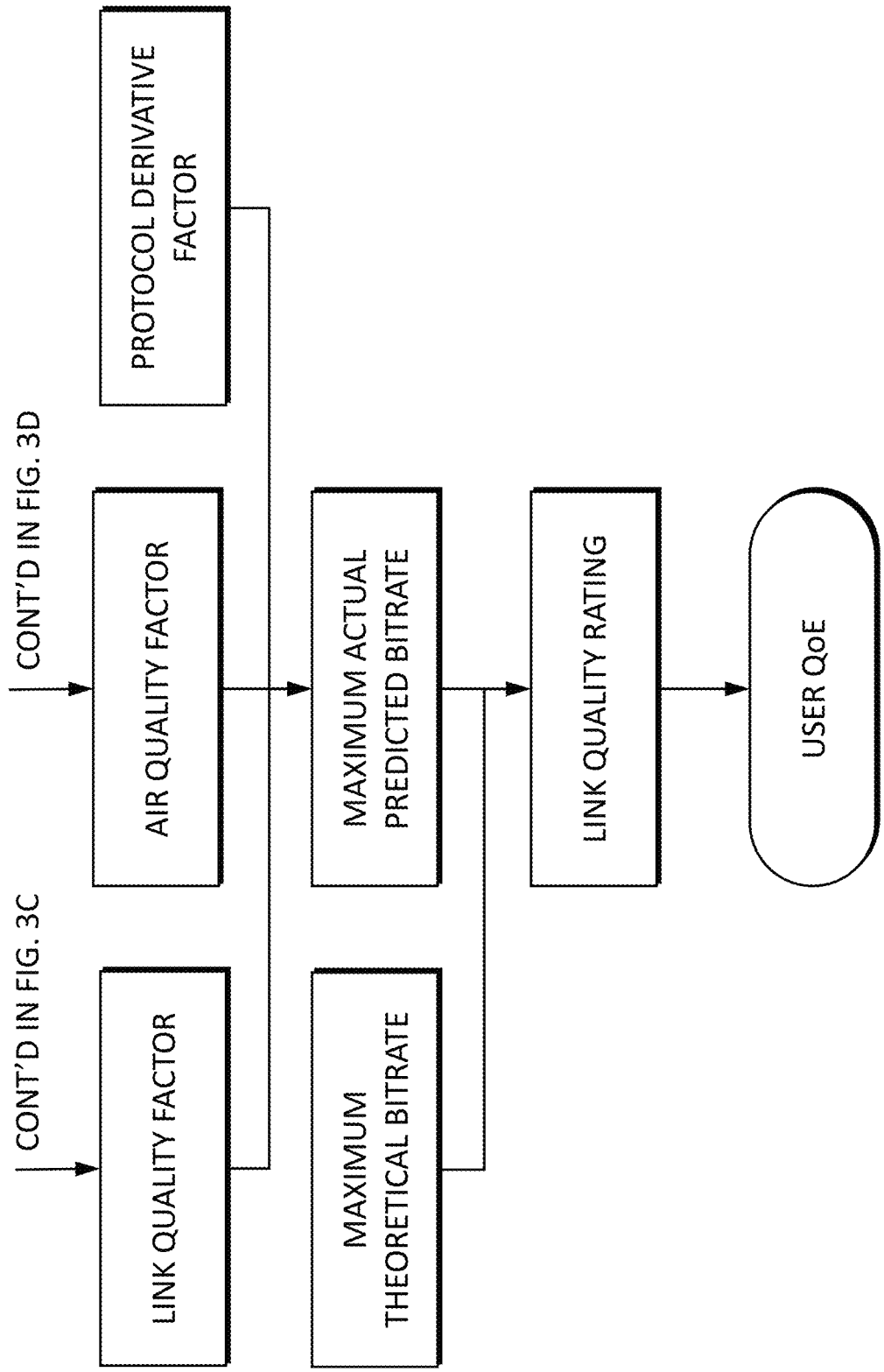
FIGS. 3B-3D are schematic diagrams illustrating the various components in determining a quality of a wireless link within a WLAN, according to some embodiments of the present disclosure.
Figure 3C:
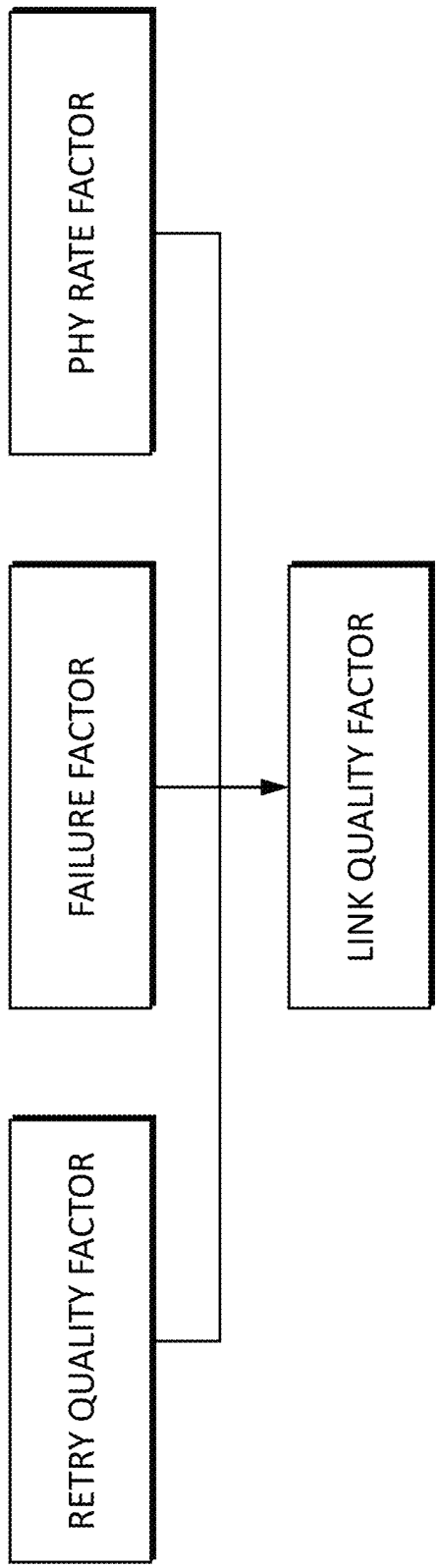

With continued reference to FIGS. 3B and 3C and to step 304 of method 300 (FIG. 3A), in some embodiments, a Link Quality Factor (LQF) may be intended to reflect the actual rate of packet transmission between a transmitter node within a WLAN (e.g., an AP) and an STA, within a given transmission shared medium. In some embodiments, wireless LQF may be based on one or more of the following parameters:

Current retransmission rate: A rate of retransmissions or 'retries,' defined as the rate at which frames need to be resent from an STA to an AP or from an AP to an STA because of an error in the transmission. Retransmission rate information may be obtained from the data link layer of the transmission protocol.

Current failure rate: An error and timeout rate of uplink and/or downlink data packet transmission.

Current expected PHY rate: The expected physical layer (PHY) data rate at a given received signal strength (RSSI), defined as the data rate capacity of the physical layer, as may be measured at a reference point in the interface between the datalink layer and physical layer.

Accordingly, in some embodiments, a wireless link LQF may be defined by the following function:

LQF=$f$(Current Retry Factor,Failure Factor,PHY Rate Factor[RSSI])

Wireless Link Retry Quality Factor

With continued reference to FIG. 3C and to step 304 of method 300 (FIG. 3A), in some embodiments, a Retry Quality Factor (RQF) may be calculated as the ratio between the current rate of retransmissions over the wireless link under evaluation and the expected rate of retransmissions in an optimal 'clean' shared medium.

It should be noted, that in practice, a retransmission rate is almost always above zero, because in a typical residential environment that represents physical and other transmission obstacles, even in the absence of interference or excessive load, the transmitter will need to retransmit at least some packets, especially, if the end-device moves further within the environment from the AP.

Accordingly, in some embodiments, an RQF measure of the present technique is based, at least in part, on a current retransmission factor over the expected retransmission factor within the given shared medium:

Current Retry Factor=$f$(Current Retries)

where Current Retries is the current number of retransmissions that a packet was retransmitted before reaching its destination, as reported by the data link layer of the transmission protocol. In may be observed that the Current Retry Factor represents a factor by which the effective maximum theoretical bitrate of a wireless link is decreased due the need to retransmit certain packets multiple times.

Thus, to clearly define whether a wireless link under evaluation is experiencing an excessive number of retransmissions relative to its expected condition per the given wireless link RSSI value, the present technique define the Retry Quality Factor as:

Retry Quality Factor=Current Retry Factor/Expected Retry Factor[RSSI]

Retry Quality Factor (RQF) may reach its potential maximum when the Current Retry Factor is close to the Expected Retries Factor [RSSI]. Conversely, RQF declines when its actual Current Retry Factor is lower than its Expected Retries Factor [RSSI], and thus shows that the link reflects deteriorating performance, due to, e.g., wireless shared medium (air) factors, transmission protocol issues, or otherwise, which may cause an AP to keep retransmitting packets which are not being received by the STA.

Wireless Link Failure Factor

With continued reference to FIG. 3C and to step 304 of method 300 (FIG. 3A), in some embodiments, a Failure Factor of the present disclosure may be calculated based on monitoring, e.g., a number of times a packet is retransmitted without receiving an acknowledgment (ACK) message in return within a specified timeout. An increase in failure rate may indicate deteriorating performance, due to, e.g., wireless air factors, transmission protocol issues, or otherwise. In some embodiments, the present disclosure defines a maximum number of failures beyond which a wireless link may be considered to be in a state of failure. Accordingly, in some embodiments, a Failure Factor of the present disclosure may be defined as:

Failure Factor=$f$(Failures,Maximum Number of Failures)

Wireless Link PHY Rate Factor

With continued reference to FIG. 3C and to step 304 of method 300 (FIG. 3A), in some embodiments, a PHY Rate Factor of the present disclosure may be calculated as a ratio between the rate at which a data packet is transmitted over a wireless link between an AP and an STA and the expected optimal transmission rate given the link RSSI. In some embodiments, a PHY Rate Factor may be affected by current wireless air factors, given the specific RSSI that the AP is sensing from the STA signal.

Accordingly, the following calculation may be performed:

Maximum Expected PHY Rate=$f$(Protocol Standard, Channel Bandwidth,Number of Spatial Streams, Guard Interval)

Maximum PHY Rate[RSSI]=$f$(Maximum Expected PHY Rate,RSSI)

PHY Rate Factor=$f$(Current PHY Rate,Maximum PHY Rate[RSSI])

The Maximum Expected PHY Rate represents the maximum achievable PHY rate in an optimal interference-free wireless shared medium, based on the following parameters of the link:

Standard used: 802.11b, 802.11g, 802.11n, or 802.11ac.
Number of spatial streams.
Channel bandwidth (20, 40, 80 or 160 MHz).
Guard interval.

Based on these parameters and the 802.11 standard rates, the maximum achievable PHY rates can be determined. Table 1 below shows a non-exhaustive list of the maximal achievable PHY rates.

TABLE 1

| 802.11 Protocol | Channel Width [Mhz] | Max PHY Rate [Mb/s] |
|---|---|---|
| 11b | 20 | 11 |
| 11g | 20 | 54 |
| 11n 2.4 GHZ | 20 | 144 |
|  | [As example shown below] |  |
| 11n 5 GHZ 1 spatial stream | 20 [LGI - Long Guard Interval] | 130 |
| 11 ac 5 Ghz | 160 [SGI - Short Guard Interval] | 866.7 |

Because PHY rates decline with an increase in the distance between an AP and an STA, due to natural signal attenuation, the expected PHY rate at a specific RSSI value detected by an AP may be lower than the maximum achievable PHY rate for a given shared medium. By way of background, typical Wi-Fi signal propagation causes a natural signal attenuation the further away an end-device moves from the AP. Therefore, there is a need to characterize the expected PHY rate at a specific RSSI associated with the link under evaluation.

The calculated expected maximum PHY rate at the given RSSI may be compared relative to the actual current PHY rate, to determine the PHY Rate Factor. In other words, once an optimal (maximum) PHY rate at a given RSSI is determine in an optimal 'clean' shared medium, the PHY Rate Factor may be determined relative thereto. Accordingly, a PHY Rate Factor score of 100% may be assigned when a calculated expected maximum PHY rate at the given RSSI reaches the maximum theoretical PHY rate achievable by the link. This score may decline when the calculated expected maximum PHY rate at the given RSSI decreases, e.g., due to current wireless air interferences, other wireless shared medium causes, and/or hardware-related causes affecting any network device.

In some embodiments, when a wireless link is idle without much ongoing data traffic, data packets may be transmitted at a base rate of 1 Mbs, wherein this rate may lead to a PHY indicate a critical state of the link. Accordingly, in some embodiments, the present disclosure may disregard sampled data packets transmitted at the base rate of 1 Mbs, as not representing actual data transmission rates, and instead using the most recently sampled valid transmission rates.

Wireless Link Air Quality Factor

Figure 3D:
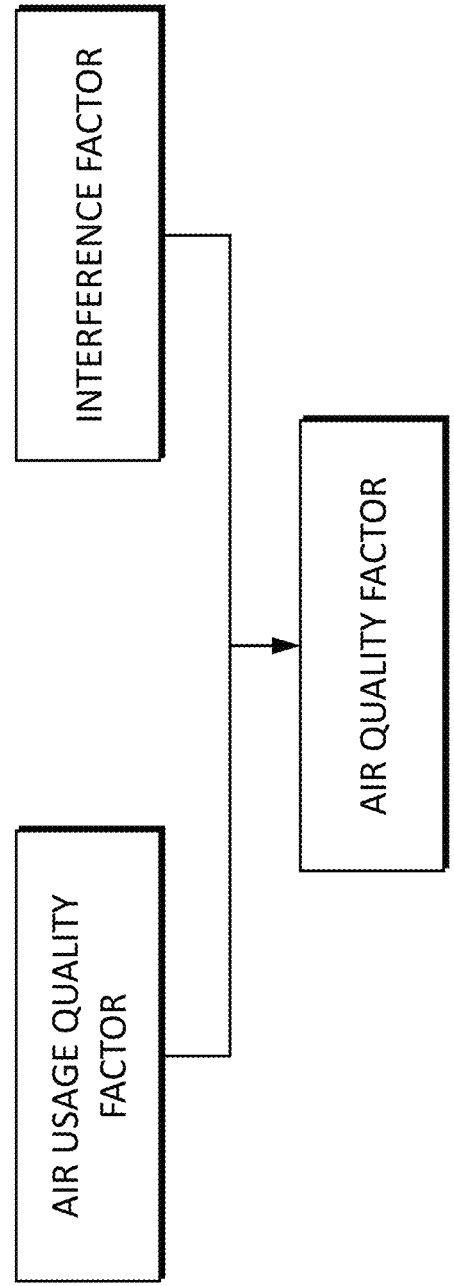

With reference to FIG. 3D and continued reference to step 304 of method 300 (FIG. 3A), in some embodiments, the present technique provides for determining a wireless shared medium (air) quality factor, based, at least in part, on a usage or load factor and an interference factor. In some embodiments, wireless air quality factor may be determined as:

$$\text{Air Quality Factor} = f\text{:(Air Usage Quality Factor, Interference Quality Factor)}$$

The challenge here is to retrieve this final channel utilization at times when the channel is used by other APs in the shared medium. This can be done in different ways:
- A chip which supports the metrics of channel load and channel interferences.
- The ability to scan and search for QBSS IE in beacons and to create a map of the Channel Load on the current channel along with some factor of adjacent scanned APs.

Wireless Link Air Usage Quality Factor

By way of background, the distributed coordination function (DCF) of the Wi-Fi protocol requires a station intending to transmit data to detect the channel status for an interframe transmission space. If the channel is found to be busy during the detection interval, the station will defer its transmission. In order to avoid collisions when multiple stations sense simultaneously find that the channel is released and then try to seize the channel, DCF may also specify random backoff, where a station is forced to defer its access to the channel for an extra period. DCF provides that each Wi-Fi frame contains an information element called network allocation vector (NAV). When a station intends to transmit a packet, the station analyzes the NAV of each frame being transmitted in the medium, to determine the duration time required for the transmission. Based on this, the station can determine when a channel is 'loaded' with data traffic from outside Wi-Fi service set, and refrain from sending frames in the medium, as explained above. Thus, a loaded channel may cause slower data traffic within a wireless link, and its performance will be reduced.

Figure 4A:
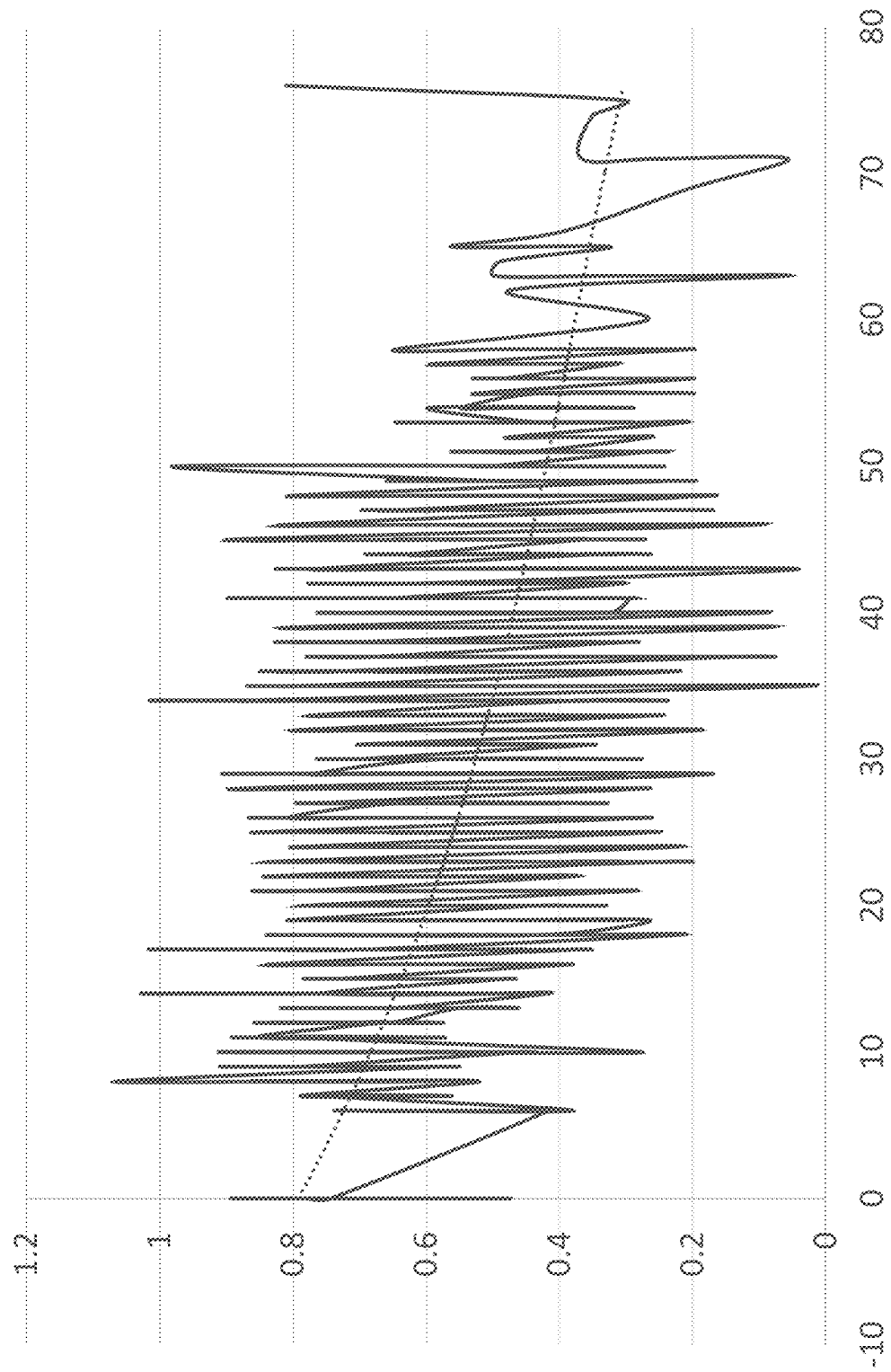
FIGS. 4A-4C show the results from an experiment for determining an Air Usage Quality Factor, according to some embodiments of the present disclosure.
Figure 4B:
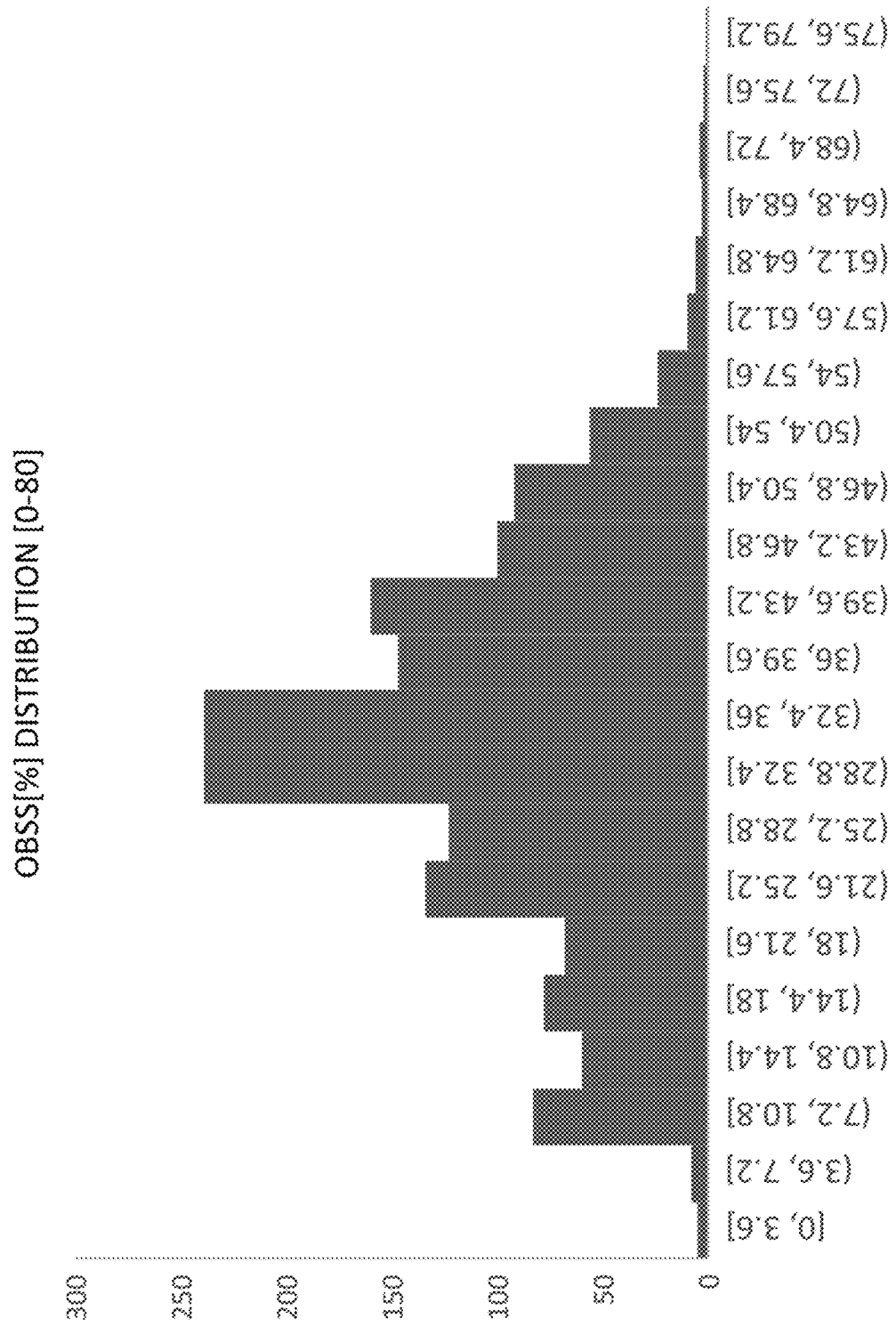
Figure 4C:
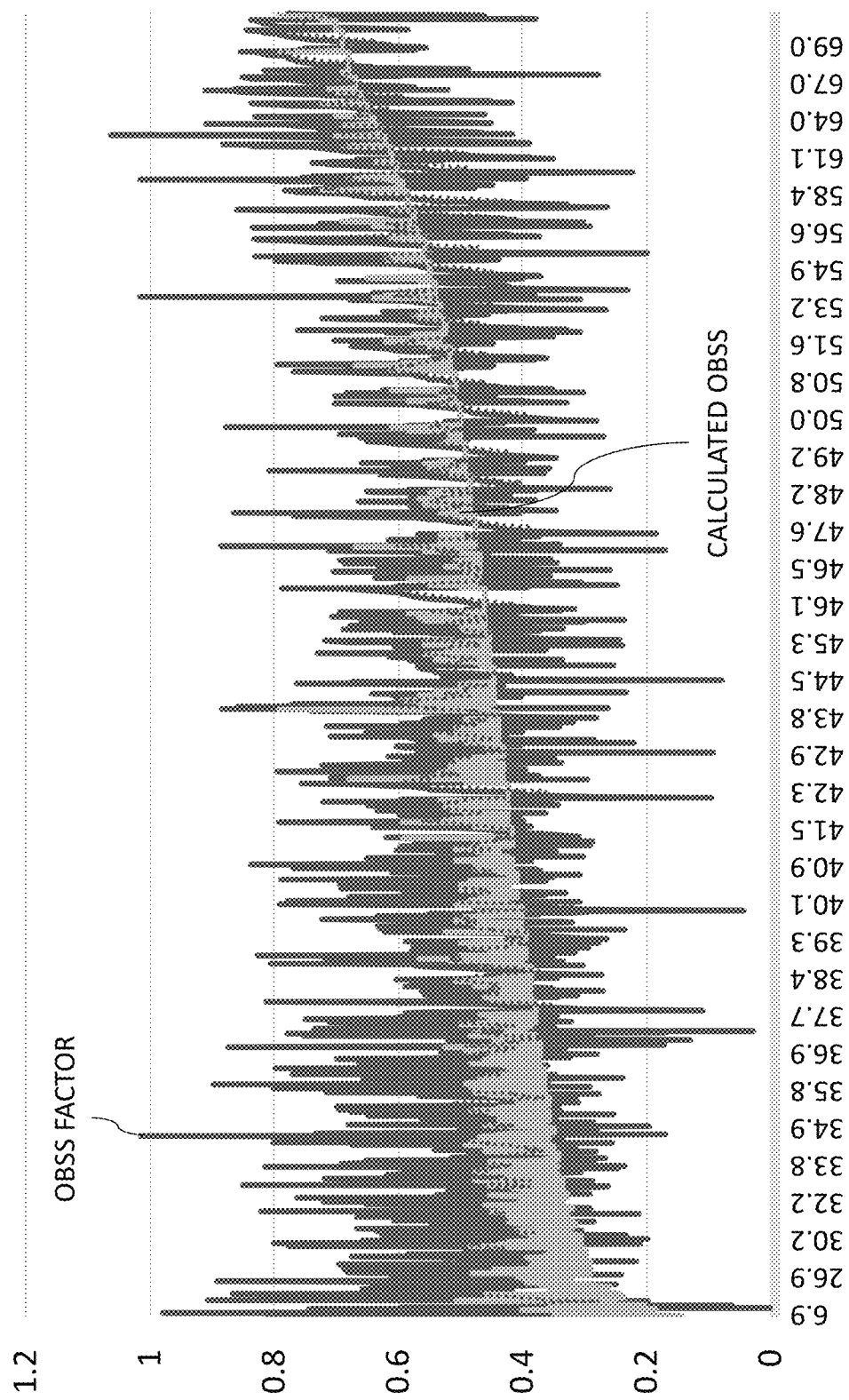

In some embodiments, the present disclosure provides for determining an Air Usage Quality Factor of the present disclosure, which reflects an effect of channel load or air usage on link transmission rates. In some embodiments, the Air Usage Quality Factor may be calculated based on experimental results, wherein channel usage from outside a Wi-Fi service set (OBSS— overlapping or other base service set) may be incrementally increased, while measuring link quality and channel predicted bitrate. FIGS. 4A-4C show the results from such an experiment, wherein a derived function which determines Air Quality Factor as a function of channel load by out-of-service-set transmitters. FIG. 4A shows experimental results wherein an OBSS load was incrementally increased from 0-80% channel load, and wherein In some embodiments, an OBSS function of the present technique may be represented as (with reference to the graph plotted in FIG. 4A):

$$y = -7e - 0.7x^3 + 0.0001x^2 - 0.0121x + 0.7919.$$

Wireless Link Interference Quality Factor

In some embodiments, the present disclosure provides for determining an Interference Quality Factor. The Clear Channel Assessment (CCA) function of the 802.11 protocol can be used for detecting channel interferences as part of a 'listen before transmit' (LBT) procedure. This mechanism mitigates potential interference by avoiding use of frequencies upon detection of other transmissions on those frequencies, e.g., from sources that are non-WLAN transmission devices, such as microwave, cordless phones, etc. Thus, when a station detects high CCA energy in a channel, it may refrain from sending any data packets, potentially causing data traffic to slow down or even to completely halt.

Figure 5:
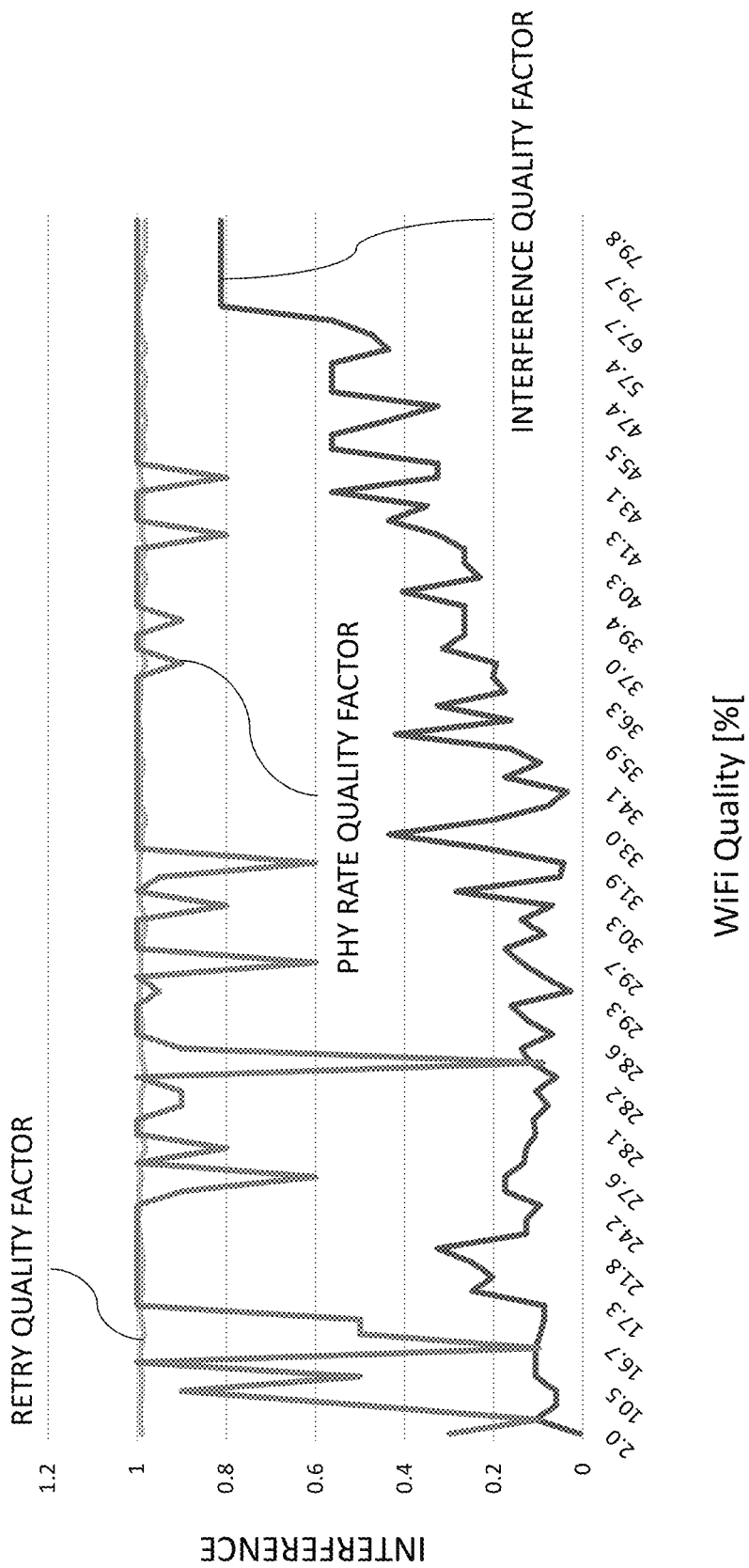
FIG. 5 shows results from an experiment which measured a wireless link quality while increasing the interference energy in the medium, according to some embodiments of the present disclosure.

FIG. 5 shows results from an experiment which measured a wireless link quality while decreasing the interference energy in the medium. As can be seen, the plot shows an incrementally decreasing interference value, where interference load mainly affects the Interference Quality Factor, which may be represented by the following function:

$$\text{Interference Quality Factor} = 1 - \text{LOG}(\text{Interference, Maximum Interference})$$

Where Maximum Interference=40%.

Wireless Link Maximum Actual Predicted Bitrate

With reference back to method 300 (FIG. 3A), in steps 306 and 308, the present technique provides for determining (i) a maximum actual predicted bitrate of the wireless link under evaluation, based, at least in part, on the link quality parameters and factors determined in step 304, as described herein above, and (ii) a maximum theoretical bitrate of the wireless link under evaluation as may be measured over optimal transmission conditions.

These measures are critical, because an overall quality of a wireless link under evaluation may be reflected in the actual maximum bitrate achievable over the wireless link within the given shared medium. In some embodiments, the nearer the predicted maximum bitrate in the current air conditions is to a calculated maximum theoretical bitrate achievable over the wireless link under optimal conditions (such as an interference-free shared medium and/or a lower load shared medium), the higher the overall effective link quality.

As used herein, 'bitrate,' bit rate,' or 'data rate' may refer interchangeably to the number of data bits that are conveyed or processed over a wireless communications link of connection per unit of time. Data rate or bitrate is expressed in bits per second unit (bps), often in conjunction with a prefix such as kilo (kbps), mega (Mbps), etc.

In some embodiments, in steps 306 and 308 on method 300, the maximum predicted data rate of a wireless link may be determined based on a function which modifies the maximum theoretical achievable data rate of the link, in view of other factors affecting the wireless link.

In some embodiments, the maximum theoretical achievable data rate of a link may represent the maximum data rate achievable at the physical (PHY) layer, based on a specified level of Received Signal Strength Indication (RSSI) and/or a specified channel noise floor and signal-to-noise ratio (SNR), and is defined as:

Maximum Theoretical Bitrate=$f$(Maximum PHY Rate [RSSI])

where Maximum Theoretical Bitrate is the maximum achievable rate in a given shared medium with a given RSSI, a given noise floor and signal values, and given SNR levels; and Maximum PHY Rate is the maximum data rate at the physical layer.

Figure 6:
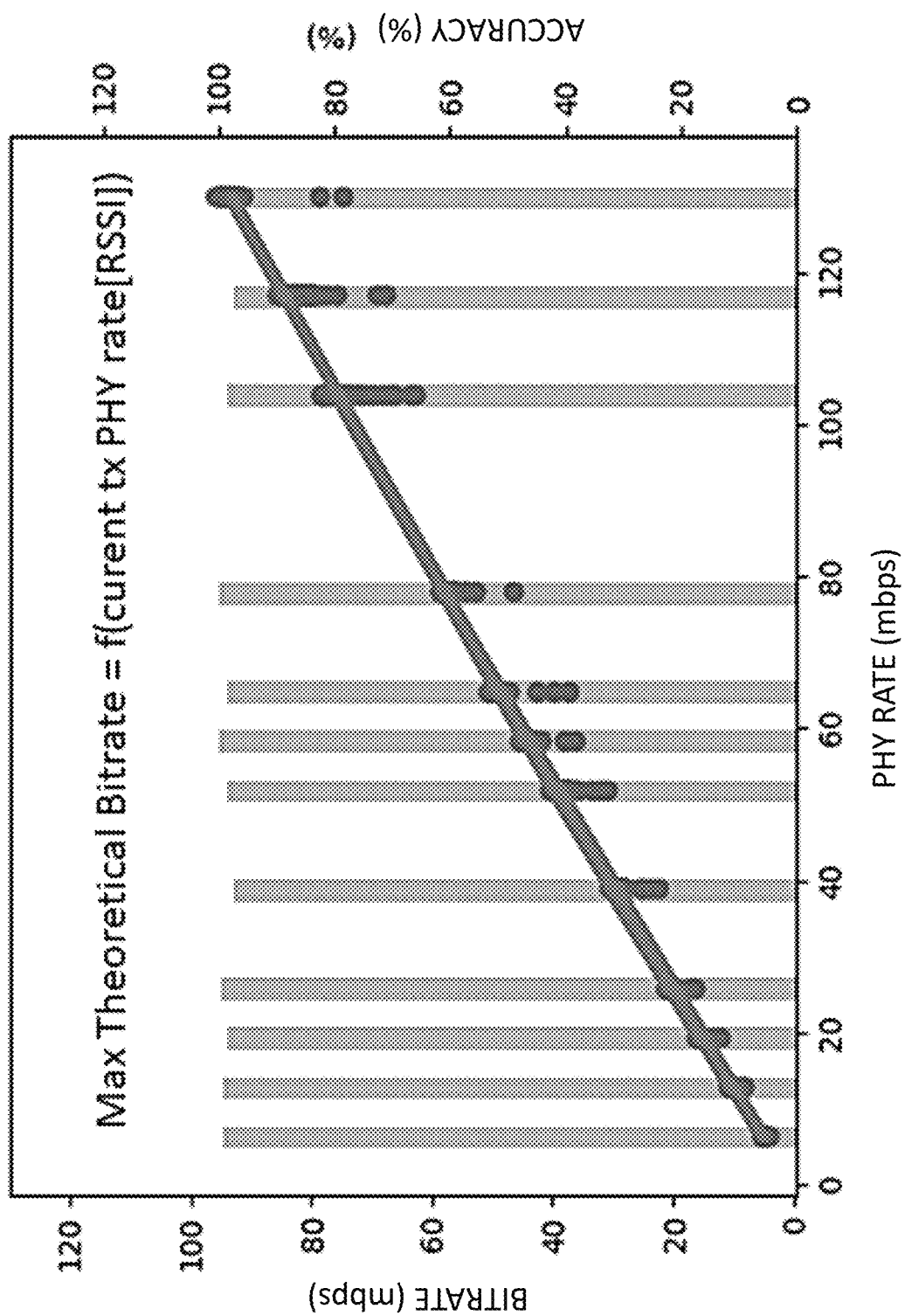
FIG. 6 shows a maximum theoretical bitrate as a function of PHY rate in a data link with respect to transmitting data packets to an end station, according to some embodiments of the present disclosure.

FIG. 6 is a graph showing a maximum theoretical bitrate as a function of PHY rate in a data link with respect to transmitting data packets over a wireless link. The graph of FIG. 6 plots bitrate as a function of PHY rate, calibrated based on the following derived formula, where the x axis shows the PHY rate and the y axis shows the maximum achievable bitrate:

$$4.69939652e{-}0.6*x^3 - 1.51860287e{-}0.3*x^2 + 8.37382783e{-}0.1*x - 3.40181550e{-}0.1$$

In some embodiments, the maximum actual predicted data rate of a wireless link under evaluation may be based on the maximum theoretical achievable data rate of the link, by applying an algorithm which further considers the factors and parameters calculated in step 304, e.g., Link Quality Factor, Air Quality Factor, and/or Protocol Derivative Factor, wherein:

The Link Quality Factor in turn reflects a Retry Quality Factor, a Failure Factor and a PHY Rate Factor; and
the Air Quality Factor reflects Air Usage Quality Factor and an Interference Factor.

In some embodiments, a weighted sum function for determining Maximum Actual Predicted Link Bitrate may be defined as:

Maximum Actual Predicted Bitrate=$f$(Link Quality Factor,Air Quality Factor,Protocol Derivative Factor*Maximum Theoretical Bitrate[RSSI])

where:

Link Quality Factor=$f$(Retry Quality Factor,Failure Factor,PHY Rate Factor[RSSI]);

Air Quality Factor=$f$:(Air Usage Quality Factor,Interference Quality Factor)

Maximum Theoretical Bitrate=$f$(Maximum PHY Rate [RSSI]).

Figure 7:
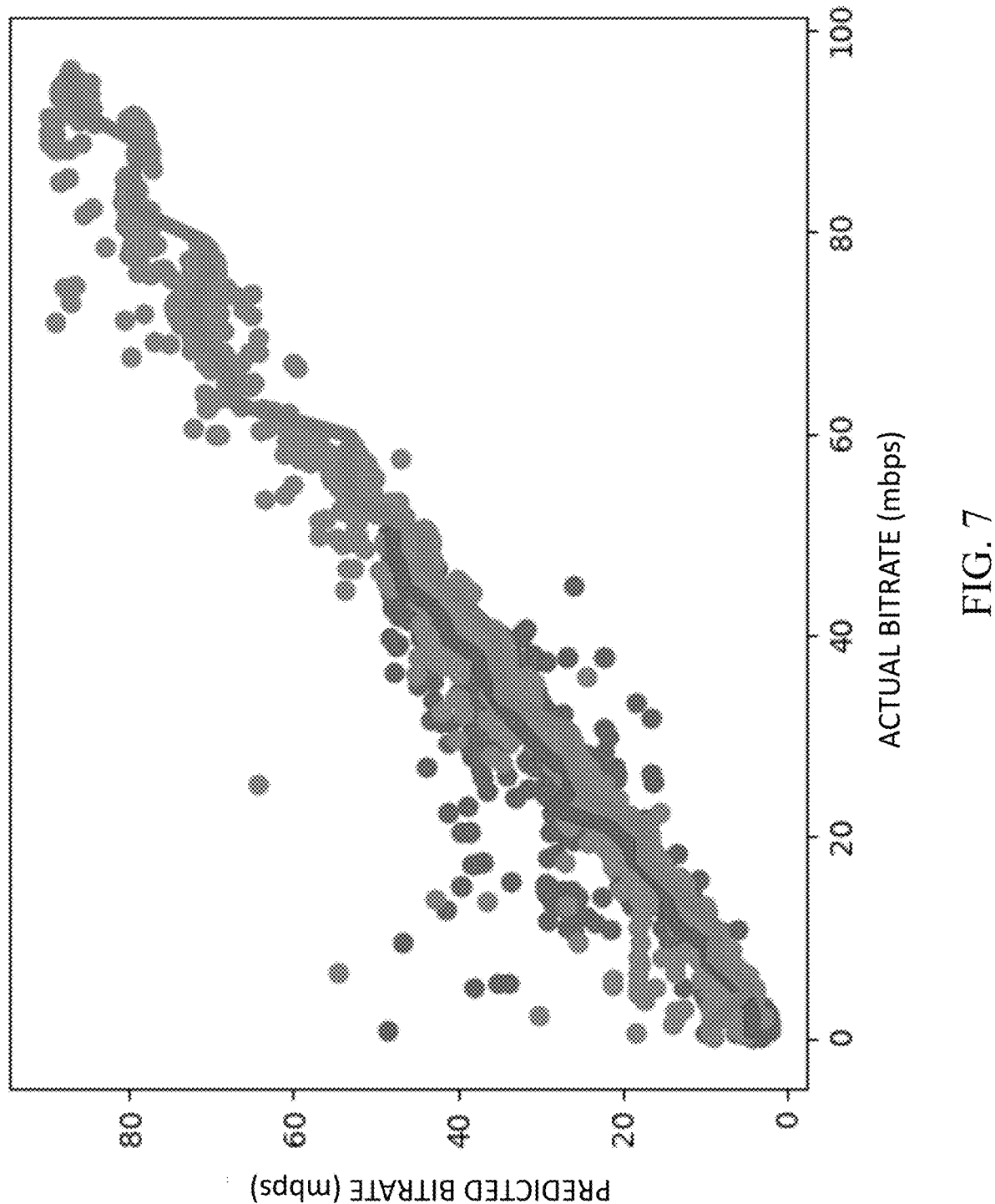
FIG. 7 plots results of actual data rates recorded using a User Datagram Protocol (UDP) protocol against maximum predicted channel data rates as calculated using the algorithm of the present disclosure, according to some embodiments of the present disclosure.

FIG. 7 plots experimental results of actual bitrate recorded over multiple wireless links, against maximum predicted channel data rates as calculated using the above-referenced method. As can be seen, the predicted bitrate is highly correlated with the actual measured bitrate.

Wireless Link Quality Rating

With reference back to method 300 (FIG. 3A), in step 310, the present technique determines an overall quality rating of the wireless link under evaluation, based, at least in part, on a ratio between the Maximum Actual Predicted Bitrate and the Maximum Theoretical Bitrate of the wireless link.

Accordingly, in some embodiments, a wireless link quality rating may be represented as:

Link Quality Rating=$f$:Predicted Maximum Bitrate→Maximum Theoretical Bitrate

Thus, when the wireless link has reached its maximum capacity, the Maximum Actual Predicted Bitrate will approach the Maximum Theoretical Bitrate of the wireless link, wherein the wireless link may be assigned a quality rating of 100%. Conversely, as the Maximum Actual Predicted Bitrate decreases relative to the theoretical maximum, the link quality rating will decrease. In some embodiments, link quality ratings thus may be normalized on a scale, e.g., of 1-100%, wherein a rating above a specified threshold (for example, 10%, 20%, 30%, 40%, 50%, 60%, 70%, 80% or 90%, or any threshold in between these values) for a predetermined time period, may be designated as having a "good" overall link quality. For example, the calculation may provide that the link quality rating must exceed a rating of 40% for at least 80% of a time window of 30 seconds, to be classified as "good." Thus, when the wireless link does not meet this threshold, it may be classified as "inadequate." In some embodiments, a wireless link may be determined to be of inadequate quality when it has experienced a predetermined number (e.g., 6) of consecutive events of not meeting the specified threshold according to this calculation. Thus, for example, a wireless link quality rating may be determined to be "inadequate" when it has experienced a dip below 40% link quality rating for more than 80% of the specified time window, during 6 consecutive time windows.

Wireless Link Quality of Experience (QoE)

With reference back to method 300 (FIG. 3A), in step 312, the present technique may optionally determine a Quality of Experience (QoE) rating associated with the wireless link. In some embodiments, the present disclosure provides for determining a QoE rating with respect to an STA within a WLAN (e.g., a wireless end-device), based on one or more of the following quality factors:

STA connectivity (e.g., wireless link weakness, stability, saturation, protocol failure);
Wireless Link Quality Rating (as determined in step 310 of method 300);
AP utilization scoring (AP capacity); and/or
Type of Service Destination (IP/Transport/Port).

These factors may be concatenated together to generate a corresponding QoE rating which reflects the experience of a user of the STA. In some embodiments, a QoE rating of the present disclosure may assign one of the following ratings:

Satisfactory Status: The wireless link provides good QoE.
Advisory Status: The wireless link currently provides good QoE, however, the QoE is unstable and may be negatively impacted in the case of an increase in network data traffic.
Critical Status: The wireless link provides inadequate QoE.
Inoperative Status: The wireless link is inoperative, such that an end-deice is unable to connect to an AP within the network, an end-device experiences frequent disconnections, and/or an end-device is unable to execute applications which require a real-time data connection, e.g., live conferencing or online gaming.

In some embodiments, each QoE rating may necessitate a specific repair action, wherein the repair may be performed in an automated fashion, e.g., using a software agent of the present disclosure, or by providing suitable notifications and/or action recommendations and/or repair instructions to a Customer Care Center and/or a user.

In some embodiments, QoE rating may be dependent on the type of service being consumed by the end-device or user, wherein each type of service may have different wireless link requirements and a different set of service attributes to enable a reliable and stable connection. For example, certain categories of service, such as online gaming or conferencing, depend on minimal service latency, whereas video streaming typically is more latency-tolerant, but may impose stricter jitter requirements. For example, when a user of a wireless device utilizes a maximum actual predicted bitrate of a wireless link, but the service being utilized by the user only requires relatively low bandwidth (e.g., internet browsing or instant messaging), the QoE rating may indicate a "satisfactory" rating. However, when a user does not reach the maximum actual predicted bitrate of a wireless link resulting in good bandwidth availability and "satisfactory" Wireless quality level, but the service being utilized is video streaming, the QoE may still be rated as "critical," when, for example, the bandwidth could not support high resolution streaming. In the first case, no action may be required as the QoE was rated "satisfactory." However, in the second case, the present disclosure may recommend a channel switch within the wireless network and/or client connection reset, depending on the root cause of the slow connection.

Determining Causes of Wireless Link Ratings

In some embodiments, the present disclosure provides for using a wireless link quality rating as determined using., e.g., method 300 of the present disclosure, to differentiate between potential root causes of a low quality rating, e.g., due to unfavorable wireless channel condition or device performance.

Thus, in some embodiments, the present disclosure provides for determining whether the actual bitrate or service being used is limited by link conditions or device performance. For example, when device usage does not reach the predicted maximum bitrate, that may indicate satisfactory QoE. However, in some cases, the type of service being used may benefit from increased bitrate which could enhance user experience. For example, it is possible that the maximum bitrate is not reached, but the service used is video streaming with low resolution. Due to the auto-tune mechanism, the server decreased immediately the bitrate and thus the resolution in use is low. Thus, user experience may be enhanced by increasing channel capacity which may allow higher resolution streaming.

Figure 8A:
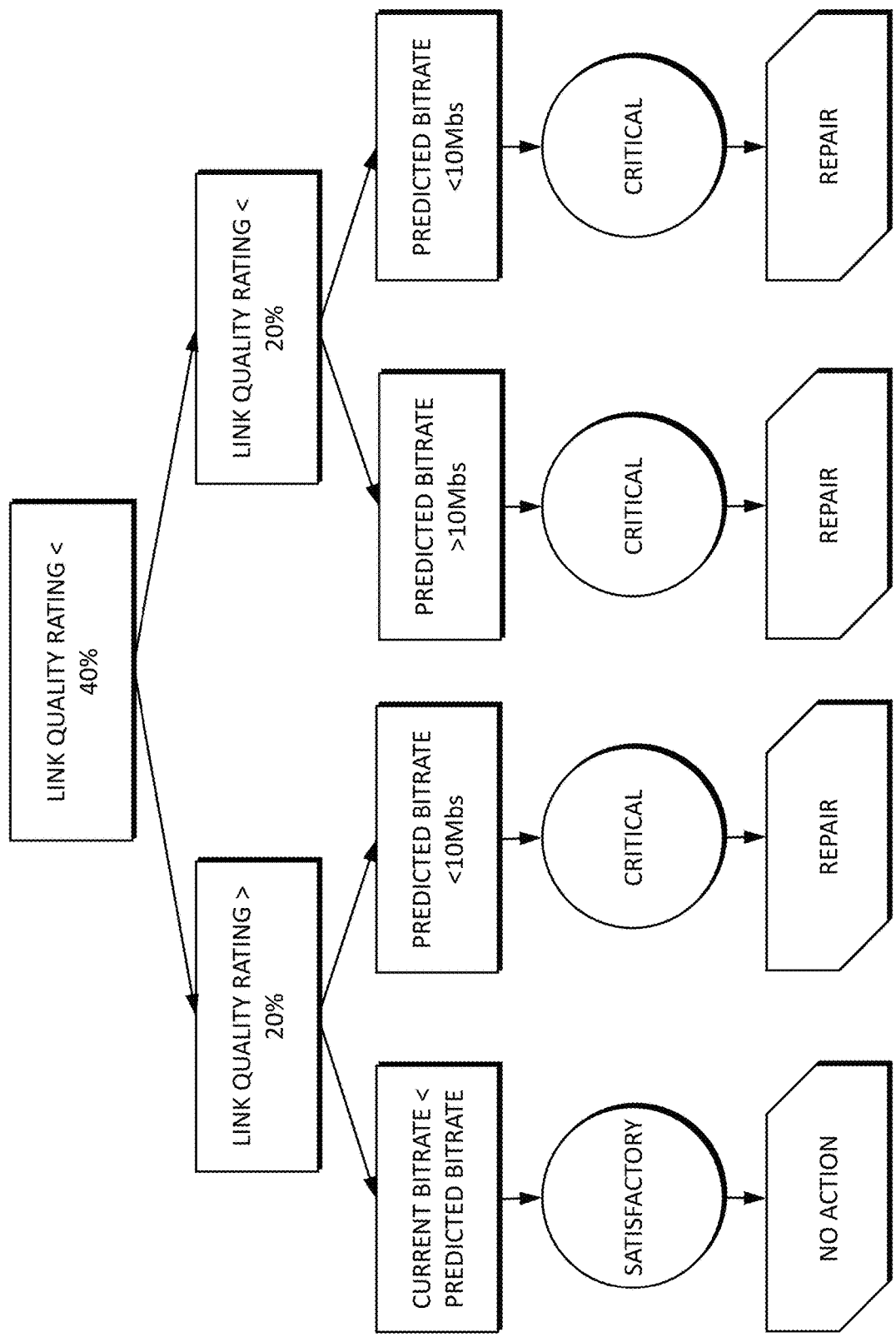
FIGS. 8A-8B are schematic illustrations of a rule-based decision tree to determine wireless connection rating, according to some embodiments of the present disclosure.
Figure 8B:
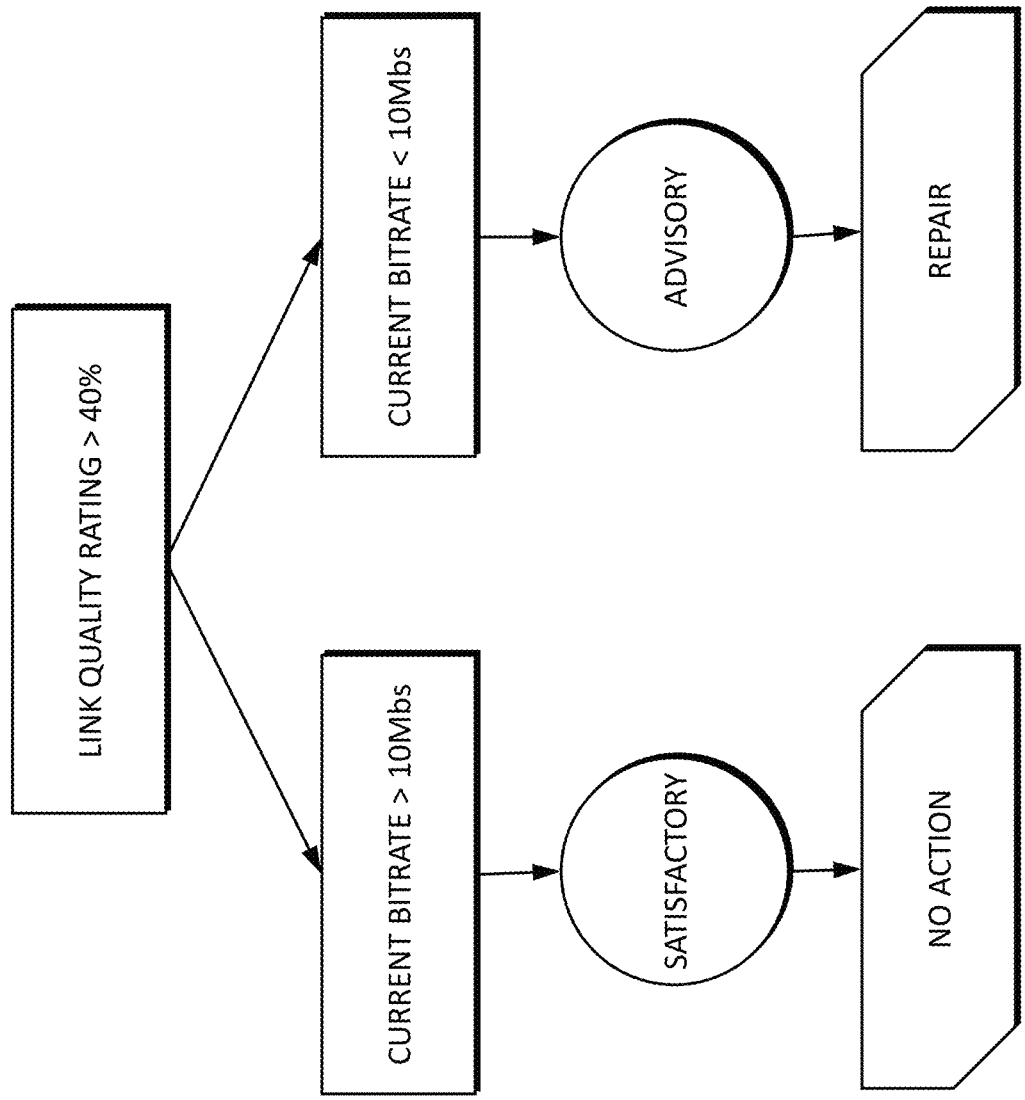

FIGS. 8A-8B are schematic illustrations of a rule-based decision tree to determine wireless connection rating, according to some embodiments. As can be seen in FIGS. 8A-8B:

If link quality rating is "inadequate," i.e., below a predetermined threshold (e.g., 40%) then:

If the link quality rating is between 20% and 40% then:
  If bandwidth availability has gone under the low threshold value, the QoE rating will be set as "Critical," with an underlying cause of "Unsatisfactory Wi-Fi Quality"
  Else if the current bitrate is under the maximum available (predicted) bitrate, the QoE rating will be set as "Satisfactory."
If the link quality rating is below 20%, then:
  If the predicted bitrate is above 10 Mbs with ether active bitrate (>200 kbs) or service in use, the QoE rating will be set as "Critical" and the underlying cause will be set as "Unsatisfactory Wi-Fi Capacity."
  If the predicted bitrate is below 10 Mbs, the QoE rating will be set as "Critical" and the underlying cause will be set as "Very Unsatisfactory Wi-Fi Quality"
If link quality rating is "Good," then either:
  If bandwidth availability is high and therefore QoE rating remains "Satisfactory," and no action is needed, or
  If bandwidth availability is low, then the QoE rating will be set to "Advisory":
    In case of a dual-band device, the present disclosure may attempt to use band steering, to switch the end-device to the higher band, to reach a higher bitrate, or
    In case of a single band device, a recommendation may be sent to install an additional Wi-Fi extender to potentially increase the bandwidth capacity within the WLAN.

Table 2 below table summarizes the link quality rating rules.

TABLE 2

| QoE Rating | Link Quality Rating | Threshold [%] | Available Bandwidth | Predicted Bitrate | Action |
| --- | --- | --- | --- | --- | --- |
| Satisfactory | Good | >40% | High | All | No Action |
| Critical | Inadequate | >20% > 40% | Low | All | Repair |
| Advisory | Good | >40% | Low | All | Repair (if dual-band capable) |
| Critical | Inadequate | <20% | All | <10 Mbs | Repair (Air Issue) |
| Critical | Inadequate | ≤20% | All | <10 Mbs | Repair (Device issue) |
| Critical | Inadequate | <18.5% | All | <13.5 Mbs | Streaming Repair (Device issue) |

As noted above, a predicted bitrate of a wireless link may be a function of several factors, including, but not limited to:
  Wireless link Quality factors:
    Current Retry Factor
    PHY Rate Factor
  Wireless Air Quality Factors:
    Load Factor
    Interference Factor Accordingly, these factor determinations may be used to further determine whether a "critical" QoE rating is rooted in shared medium issues or device performance issues. Thus, the present disclosure may provide for a rule-based decision tree to determine device performance issues, as follows:
  Device Issue definition: Check for device performance issues pattern such as:
    Wireless Air Quality Factors are high (Good air quality)
      Load Factor>0.7 AND
      Interference Factor>0.6

Link Quality Factor is low
 PHY Rate Factor<0.5 OR
 Current Retry Factor<0.4
Air Issue definition: Check for wireless shared medium issues pattern such as:
 Wireless Air Quality Factors are low (note that the link quality factors are not checked against as when Wireless medium is in bad condition it might impact the link quality factors accordingly):
 Load Factor<0.5 OR
 Interference Factor<0.5

When it is determined that low wireless link quality is related to device performance issues, a possible repair action may be to reset the device Wi-Fi connection.

When it is determined that low wireless link quality is related to wireless air factors, a possible repair action may be to change AP channel to a cleaner one, e.g., using a channel scanning functionality.

Figure 9A:
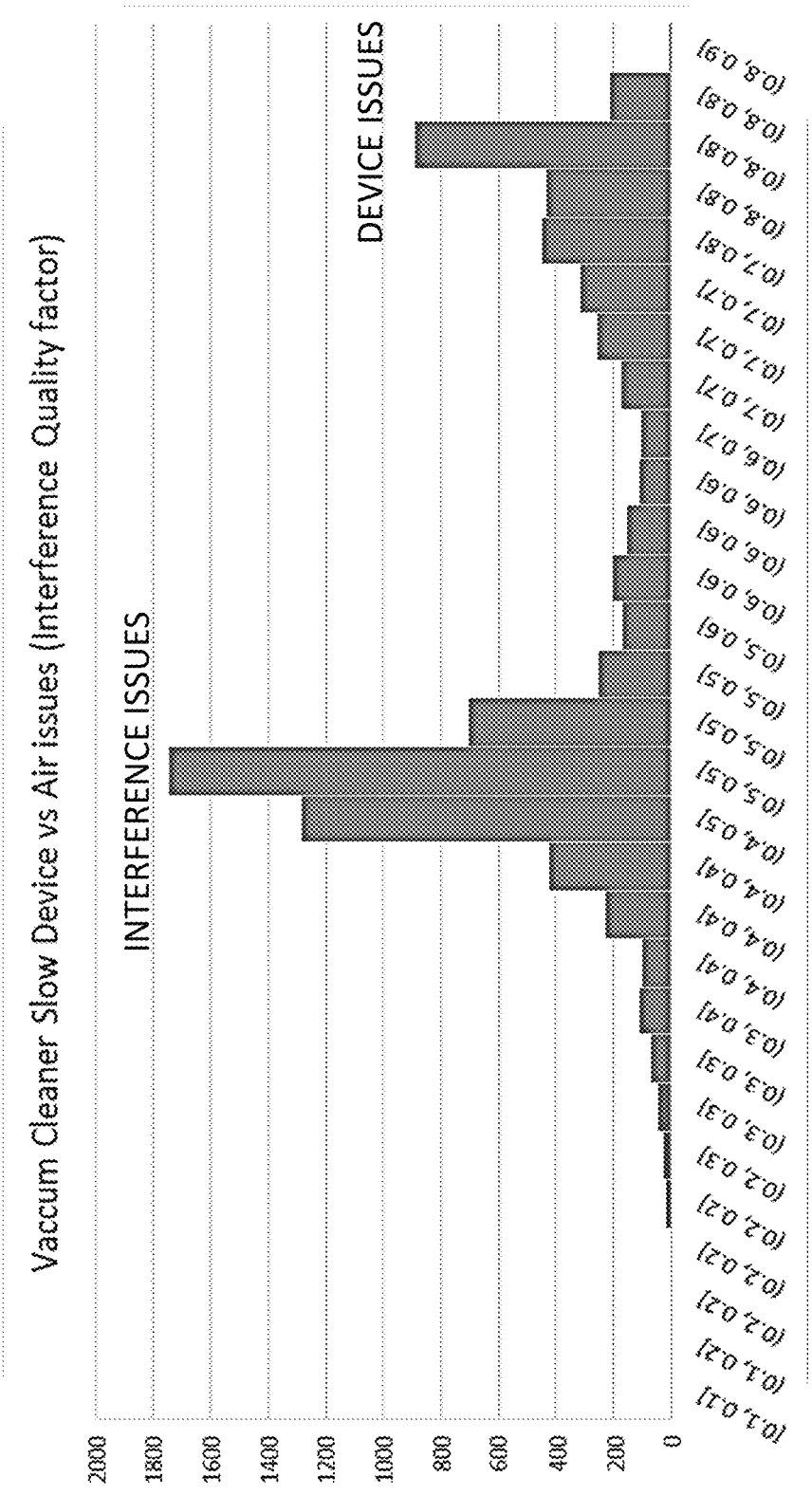
FIGS. 9A-9D show experimental results of an exemplary case study, according to some embodiments of the present disclosure.

FIGS. 9A-9E show experimental results of an exemplary case study. In FIG. 9A, a histogram is shown of all the Interference Quality Factors, with alternating interference issues and device issues. As can be seen, there are two centers of interference quality factors:

The first one in the middle with low values showing high interference in the WLAN around the device, causing device PHY rates to decrease hence pointing on a Wireless shared medium issue.

When the channel was changed, interference quality factors increased, but the device kept transmitting at low rates caused by the device receiver not "hearing" well enough data rates at higher levels, thus forcing the AP to lower them hence pointing on a device performance issue.

Figure 9B:
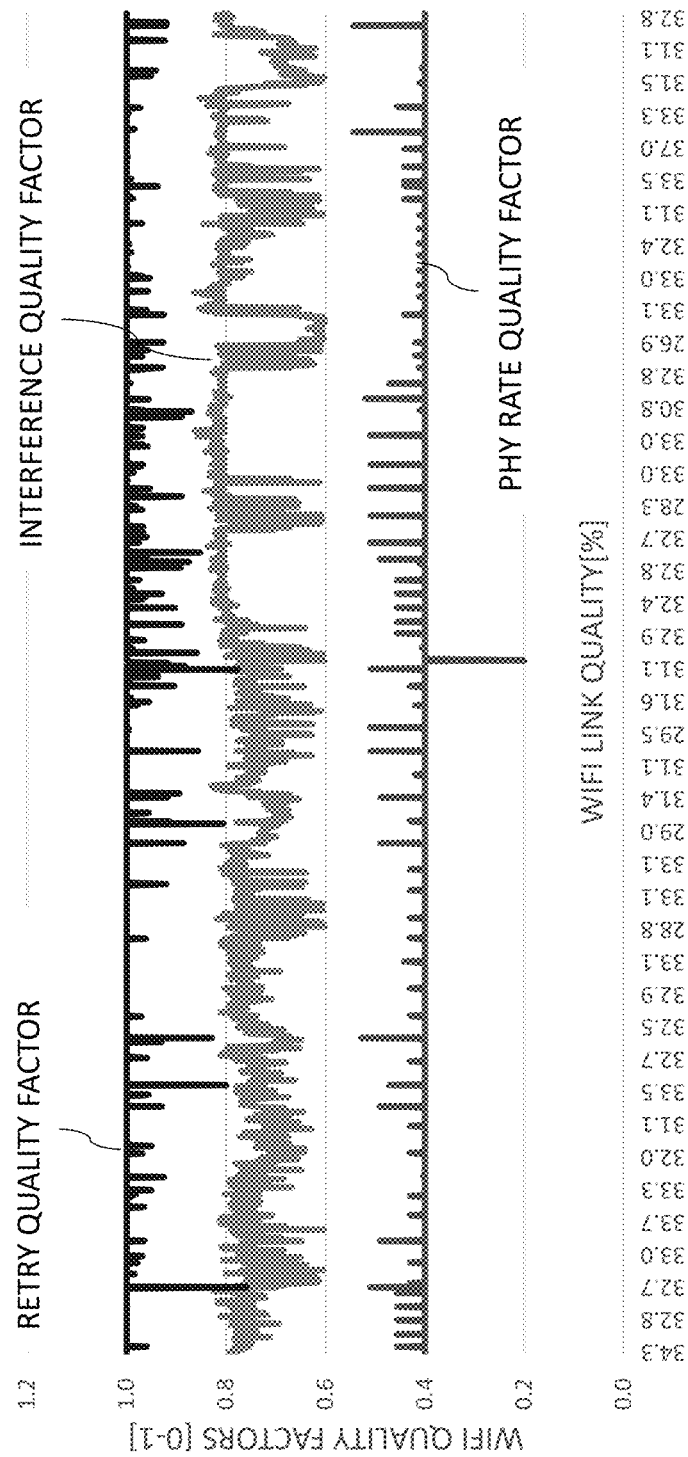

FIG. 9B shows a link quality factor above 60% (based on relatively high Air Usage Quality Factor and Interference Factor), however, the PHY Rate Factor is relatively low (below 50%) and thus the wireless link quality rating may be ascribed to a device issue.

Figure 9C:
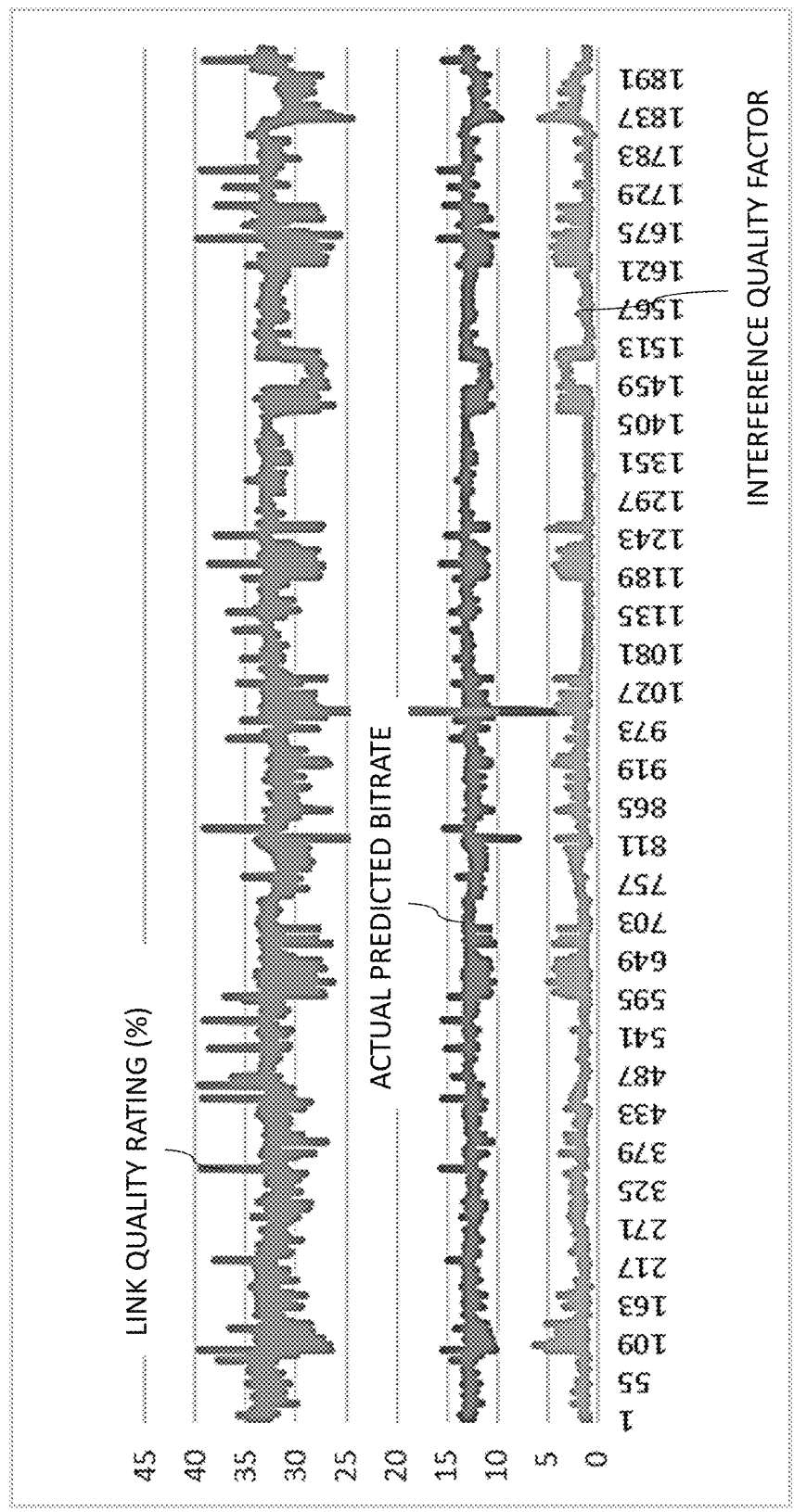

FIG. 9C shows a wireless link with low quality (<40%) based on low predicted bitrate, while the Interference Factor is low (<50%), and thus the wireless link quality rating may be ascribed to a device issue.

Figure 9D:
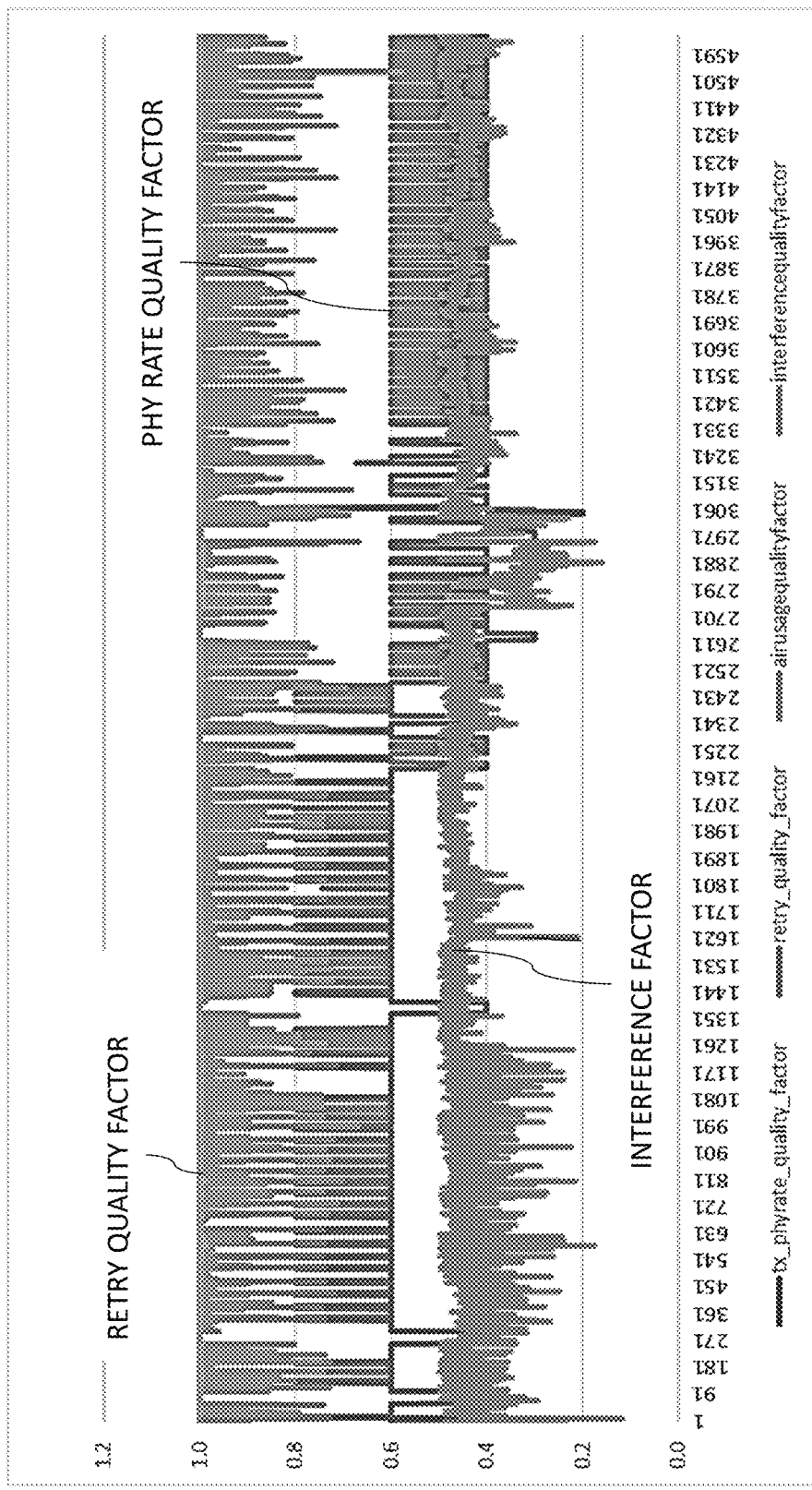

FIG. 9D shows a wireless link with low quality (<50%) where the PHY Rate Factor declines due to Interference Factor (>40%).

Figure 10:
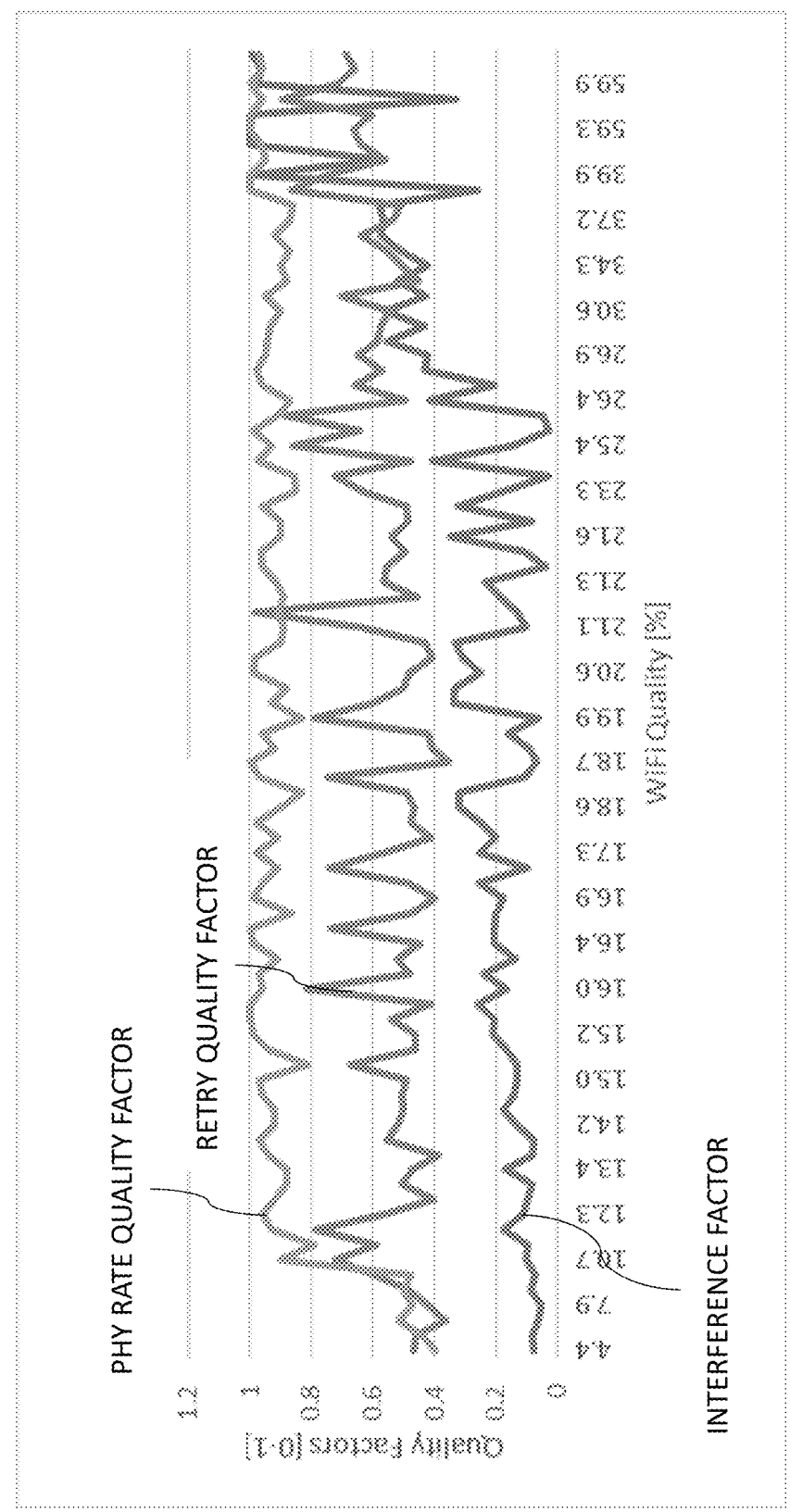
FIG. 10 shows experimental results demonstrating a case in which a Retry Quality Factor decreases (indicating lower overall link quality) due to interference/load issues in the shared medium, and not due to device-related issues, according to some embodiments of the present disclosure.

FIG. 10 shows experimental results demonstrating a case in which a Retry Quality Factor decreases (indicating lower overall link quality) due to interference/load issues in the shared medium, and not due to device-related issues. As can be seen, Link Quality Factor is lower than 40%, while the Interference Quality Factor<0.5 and the Retry Quality Factor>0.4. In such a case, when the shared medium represents a low quality factor, the Interference or Air Usage Quality Factors will be checked to determine whether their values represent a low quality shared medium. In such cases, the Retry Quality Factor will be affected as the shared medium interference/usage may impact the ability of the end-device to "hear" the Access point over the shared medium. In such case, the low link quality rating may be ascribed to the shared medium rather than the device issues.

QoE Issues in Media Streaming Due to Device Issues

FIGS. 11A-11D show experimental results of a case where device issues cause media streaming applications to experience low overall QoE rating.

Figure 11A:
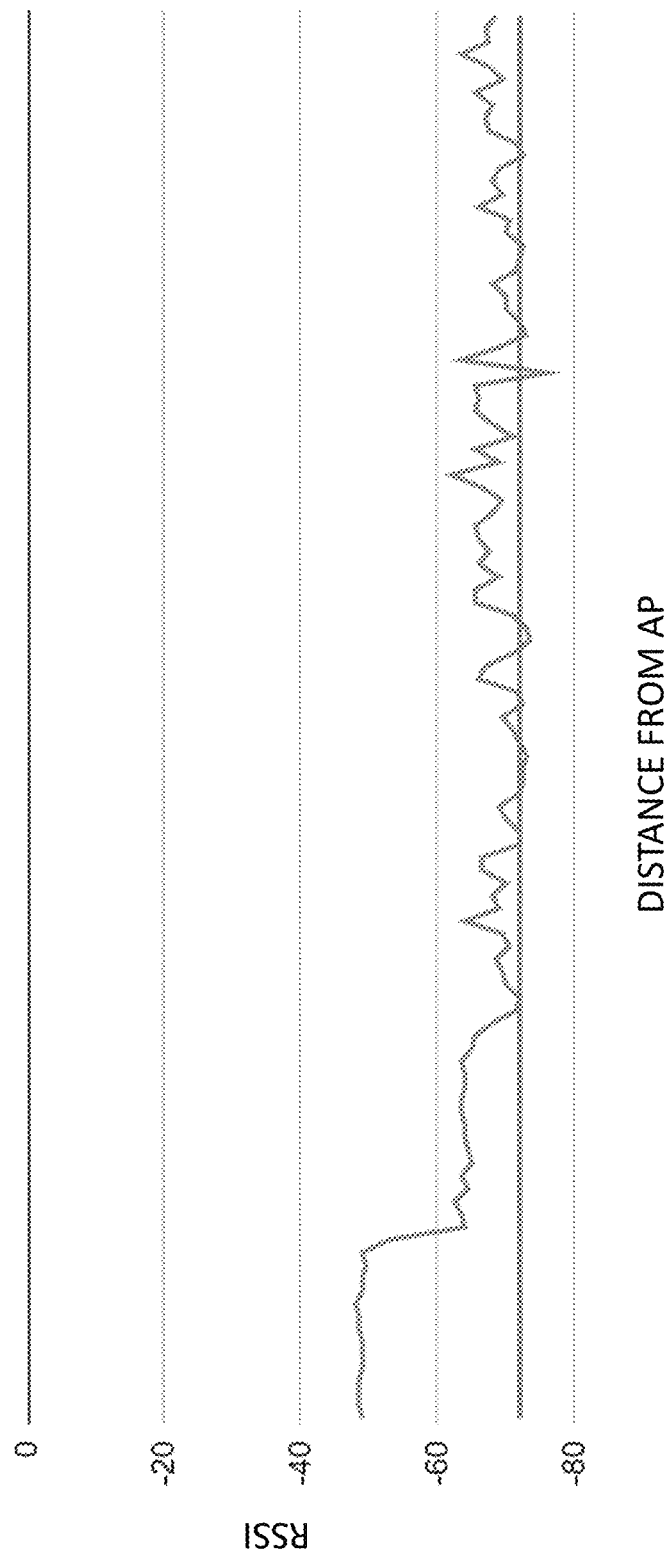
FIGS. 11A-11D show experimental results of a case where device issues cause media streaming applications to experience low overall QoE rating, according to some embodiments of the present disclosure.

In FIG. 11A, the device executing a streaming application is relocated farther away from the AP, where the RSSI drops from −48 to −68 dBm, below an RSSI threshold represented by the horizontal line. The AP is not aware of the change in location of the device, and therefore increases its retransmissions to it and lowers its PHY rate correspondingly until the connection stabilizes and the rate of retransmissions returns to normal. This mechanism is known as 'PHY rate fallback' or 'PHY rate adaptation' where the AP attempts to find a suitable PHY rate that will perform stably over the connection.

Figure 11B:
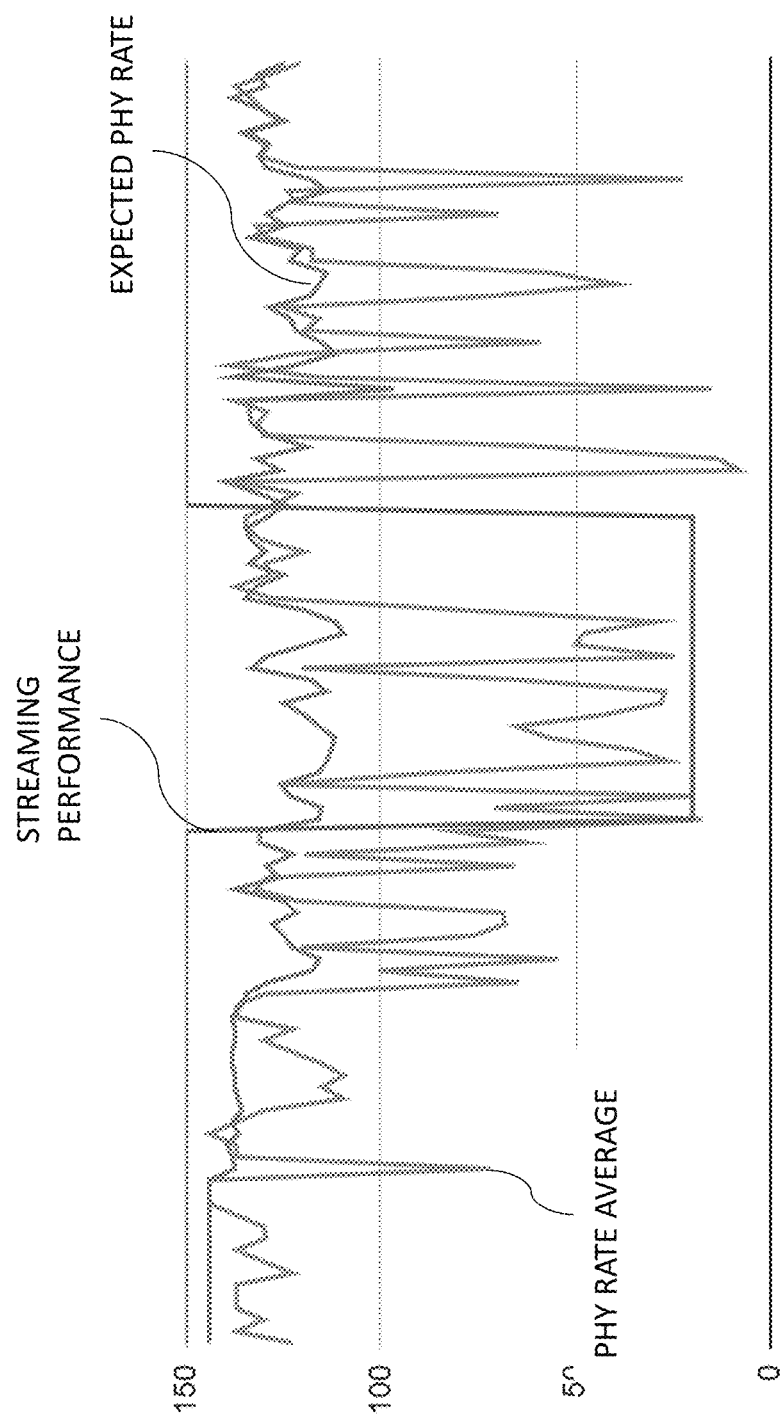
Figure 11C:
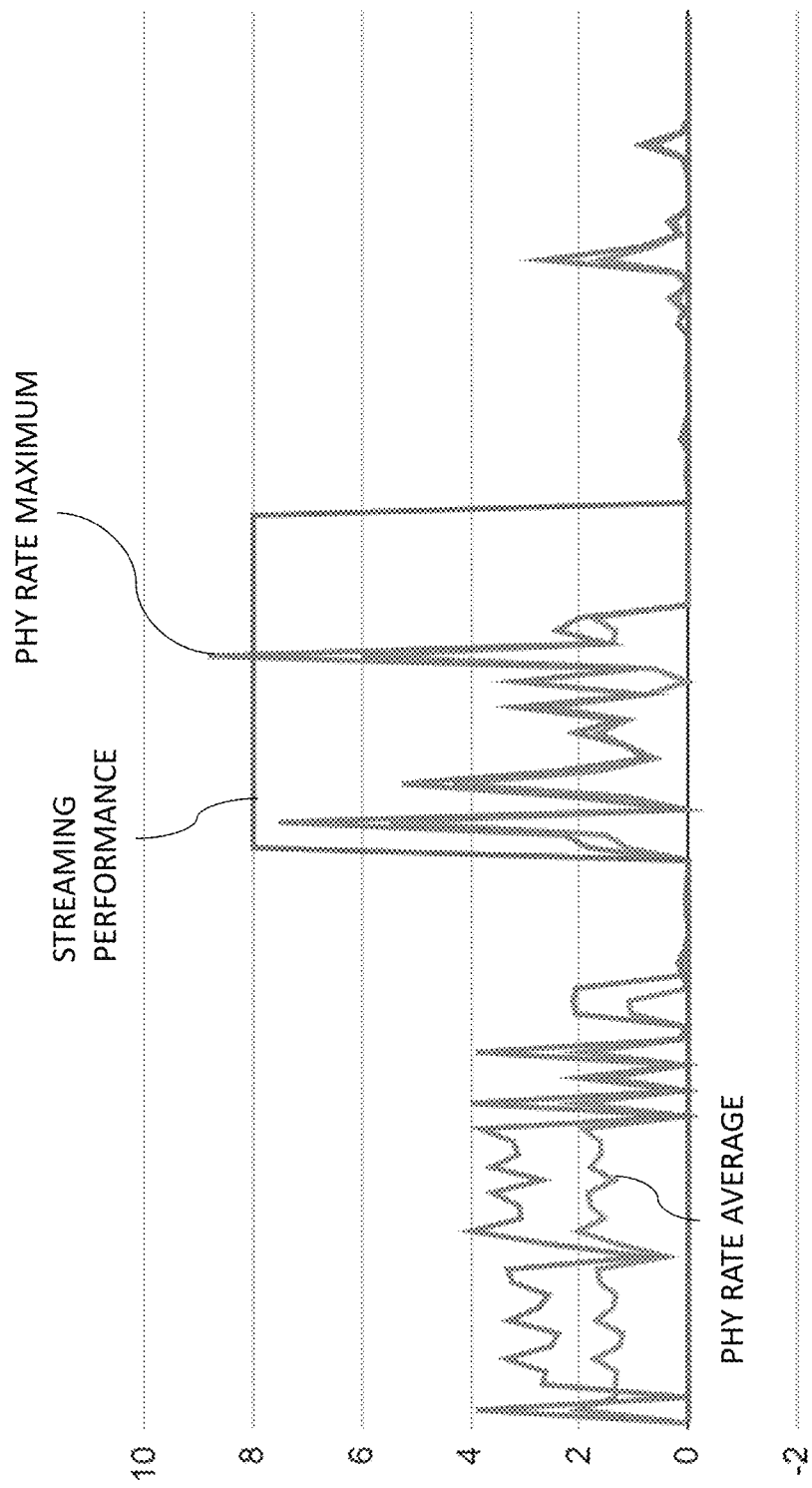
Figure 11D:
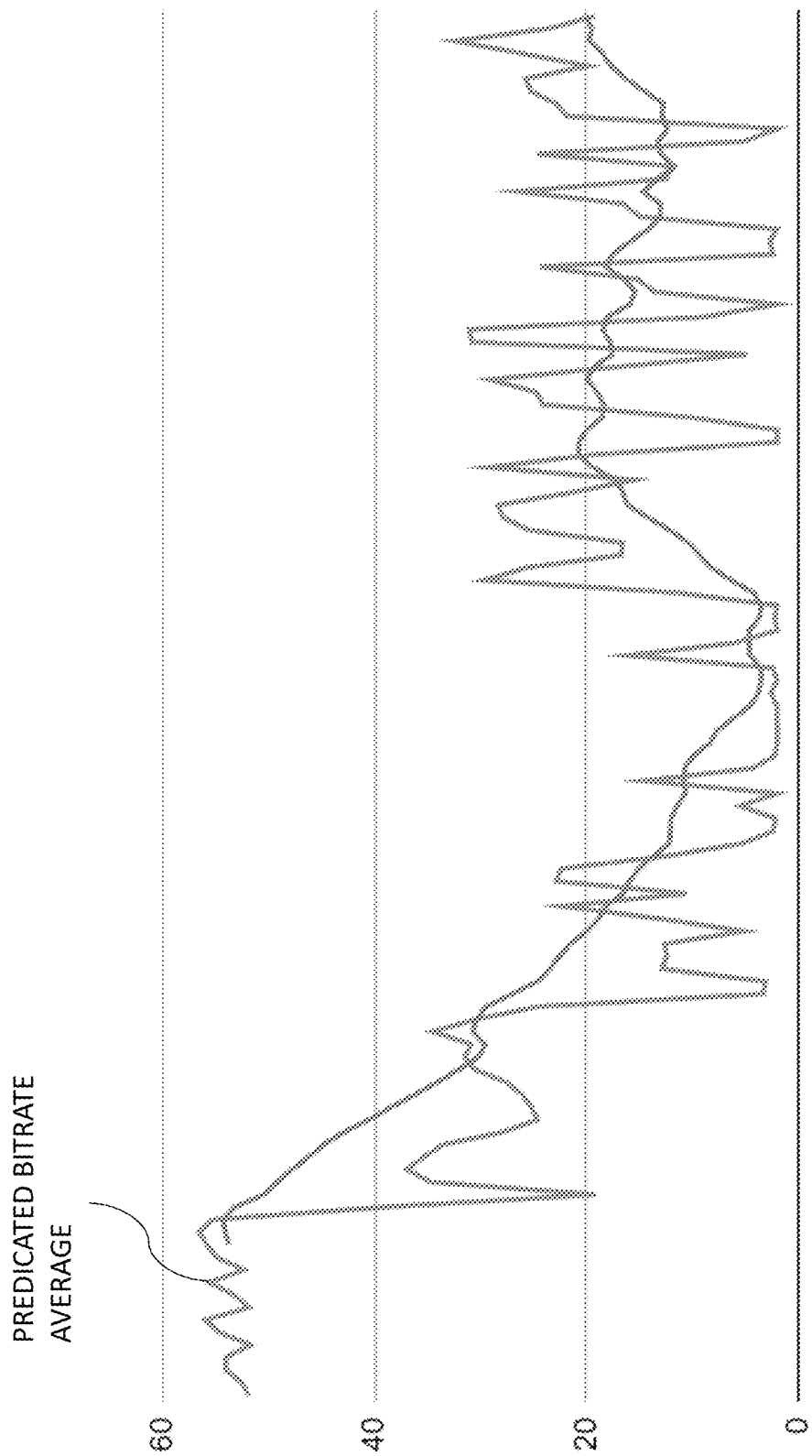

FIGS. 11B-11D illustrate the results of a media streaming session where the end-device in unable to execute a normal streaming cycle of buffering and then silence showing good buffer health. This causes the end-device to constantly attempt try to download video blocks while not having enough data buffered to play the media smoothly and without interruptions, until the streaming execution stalls.

As it can be seen, as the end-device moves relatively fast farther away from the AP, the PHY rate drops quickly, but takes relatively long time to recover, thus creating interruptions in the media video streaming. In addition, the actual PHY rate is significantly lower than the expected PHY rate given the RSSI, thereby causing the predicted bitrate of the link to drop correspondingly. After some time, the PHY rate recovers, however, it may necessitate a connection reset from the AP to restart the wireless link.

Wireless Channel Quality Ranking

In some embodiments, the present disclosure provides for real time wireless channel quality assessment of multiple communication channels within a wireless communications network. In some embodiments, the present disclosure provides for a channel score which represents channel performance and suitability for delivering a specified service to an end station within the network. In some embodiments, the channel score may be used to continuously dynamically rank available channels, to assist in selecting communication channels from the plurality of available channels for a specified service to be provided to an end station.

In some embodiments, channel score and ranking may be used to determine a cause for a predicted data rate for a channel of the multiple channels, e.g., a low predicted data rate. In some embodiments, channel score and ranking may be used to isolate a cause for a predicted data rate to quality parameters of an evaluated channel, e.g., when a channel low performance issue may be attributed to a local network issue as opposed to a broadband or access network or access network congestion.

Accordingly, a channel quality score of the present disclosure may be a value which quantifies a transmission quality of a channel. The transmission quality is evaluated based on a combination of different types of measured interference in the channel. In one embodiment the different types of measured interference include co-channel congestion, adjacent channel interference and in-band interference, although the present invention is not limited to any specific combination of interference considerations. The score is a value derived from the measurements, and for example may be a sum of all of the measurements. In some embodiments, the quality score determines the quality of the channel in absolute terms, based on its suitability and capacity for transmitting data to deliver one or more specified data services. In some embodiments, the present disclosure further ranks all available channels within a WLAN based on their relative score. In some embodiments, such ranking may be further used for dynamically selecting a channel which has the overall best score with respect to delivering a specified type or category of service to a STA of the WLAN.

In some embodiments, a channel quality score algorithm of the present disclosure considers one or more of the following parameters in determining channel quality:

Channel Load: A percentage of the channel usage in time (or busy time) with respect to the total channel measurement time (e.g., total busy and idle time).

Energy Detection: An amount of energy present in a radiofrequency (RF) which may cause interference in the channel.

Relative Noise Impact: Representing the effect of channel background noise as may be sensed by, e.g., transceiver 218.

Channel Error Score: Representing an error rate encountered while both transmitting and receiving on the specific channel.

In some embodiments, an algorithm of the present disclosure may be defined as:

Channel Quality Score=Weight_$f$(Channel Load Factor,Interference Quality Factor,Noise ratio,Channel Error)

In some embodiments, an algorithm of the present disclosure may normalize each of these values between two boundaries of 'best' and 'worst' individual channel metric. In some embodiments, a normalizing scheme of each of the parameters may be different. For example, channel load has a linear effect of channel quality, wherein as channel load begins to increase, channel quality deteriorates in a substantially linear fashion. Accordingly, an algorithm of the present disclosure may set channel load score at 200% if the channel load is 0%, decreasing the load score to 0% when it has reached to a maximum of 80%.

In another example, channel interference impact grows in a non-linear fashion. As is known, the presence of noise can reduce the capacity of an information channel. The relationship between the quantity of noise and the reduction of the capacity of the channel is non-linear. Thus, interference load score will be set as 200% if the channel load is 0% and decreased to 0% if it has reached to a maximum of 40%.

In some embodiments, the present disclosure further ranks all available channels within a WLAN based on their relative quality score. In some embodiments, channel ranking is an indicator that represents, among all available channels in a WLAN, channel quality of a current channel relative to all other available channels. In some embodiments, a channel ranking algorithm may be represented as:

Channel Ranking(*)score(relative to other channels in the spectrum)

In some embodiments, a channel quality score of the present disclosure may be generated periodically, e.g., every time interval which may be set based on QoE requirements, will be compared against other channel quality score being scanned and generated in a similar manner. For example, if the home AP channel Ch1 in FIG. 1B transmits on a channel with an absolute channel quality score of 60%, then this may be used to calculate the channel ranking score of all the channels in its spectrum.

In some embodiments, channel score and ranking may be used to determine a cause for a predicted data rate for a channel of the multiple channels, e.g., a low predicted data rate. In some embodiments, channel score and ranking may be used to isolate a cause for a predicted data rate to quality parameters of an evaluated channel, e.g., when a channel low performance issue may be attributed to a local network issue as opposed to a broadband or access network or access network congestion, for example. In some embodiments, channel score and ranking may be a factor is channel selection, e.g., when system 200 may be configured for dynamically switching to a different channel based on channel scores and relative ranking.

In some embodiments, the present disclosure provides for a system and method for AP channel selection, based upon a channel quality score. The channel quality score of the present invention is a value which quantifies a transmission quality of a channel. The transmission quality is evaluated based on a combination of channel data transmission capacity and/or different types of measured interference and/or related parameters in the channel. In some embodiments, the channel score is a value derived from the measurements, and for example may be a sum of, a weighted sum of, and/or any other function applied to, all of the measurements. Each AP of the present invention determines the score of potential transmission channels, and selects a channel which has the 'best' score and/or relative ranking, depending on its intended use. Accordingly, in some embodiments, a system of the present disclosure may provide for continuously identifying and quantifying a channel quality score and/or relative ranking, to permit an access point to more quickly identify a preferable channel for communication.

As noted above, in some embodiments, the present disclosure may be configured to perform the function of continuous and/or periodic background scanning of available alternate channels, e.g., Ch2 and Ch3 in FIG. 1B, of the finite number of channels supported by AP 108 in the predetermined spectrum.

In some embodiments, the present disclosure may be configured to scan alternate channels one at a time, wherein scan intervals may be configurable based on the service provider criteria, e.g., expected traffic within the network, etc. in some embodiments, scan intervals may be set, e.g., between 1-5 seconds. In some embodiments, scan duration may vary from 50 to 200 ms, based on current data traffic.

In some embodiments, the alternate channels are scanned in a manner which is not significantly disruptive of communications on the active channel. In some embodiments, scanning may be performed contemporaneously during data transmission within WLAN 116. For example, in particular, AP 108 may only be capable of communications on a single channel at any given point in time, the supported channel can be switched between the active channel and an alternate channel for a very brief interval, such that in a given period of time both the support for communications on the active channel and background scanning on the alternative channels are executed. In some embodiments, AP 108 may include a parallel demodulation engine which may execute background scans while the primary demodulation engine executes communications on the active channel.

The result of background scanning is creation and maintenance of the table. In the illustrated example each entry in the table includes the channel identity, the identity of access points currently operating on that channel, and the signal strengths at which those access point are transmitting. The identity of the access points may include the SSID broadcast by those access points. The signal strength may indicate the strength of the signal received at the background scanning access point, or the signal strength at which the access point is transmitting if that is readily calculable.

In some embodiments, background scanning may be executed without significantly disrupting proper communications on the active channel, by operating to quickly re-allocate the demodulation engine of AP 108 to an alternate channel to gather information and then to return to the active service channel before communications are significantly disrupted. For example, the present disclosure may be operable to calculate a point in time and duration for which moving to an alternate channel is unlikely to significantly degrade communications on the active channel. In some embodiments, such scanning takes into account one or more service types and/or categories currently being delivered over the active channel, wherein certain service types may not be disrupted and/or a user may not experience degradation in quality of experience by a brief pause. For example, email services and databased access may be tolerant of brief service pauses. However, online gaming, media streaming and/or live conferencing may suffer from even a brief pause. In some embodiments, the timing of the background scan may be selected to reduce the probability of adversely effecting communications on the active channel.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a LAN, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one hardware processor; and
   a non-transitory computer-readable storage medium having stored thereon program instructions, the program instructions executable by the at least one hardware processor to:
      monitor data traffic between an access point and an end station over a wireless link within a wireless communications network,
      derive, based on said monitoring, one or more of the following quality factors associated with said wireless link:
         i) a current retransmission rate quality factor over said wireless link,
         ii) a current physical layer (PHY) rate quality factor of said wireless link, determined based, at least in part, on a maximum expected PHY rate associated with said wireless link, wherein said maximum expected PHY rate is determined as a function of received signal strength (RSSI) by said end station,
         iii) a current usage quality factor associated with a shared medium used by said wireless link, and
         iv) a current interference quality factor associated with said shared medium;
      calculate, based on said derived one or more quality factors, a maximum predicted data rate associated with said wireless link; and
      determine an overall quality rating of said wireless link as equal to the ratio between (x) said calculated maximum predicted data rate, and (y) a maximum theoretical data rate associated with said wireless link, determined based, at least in part, on said maximum expected PHY rate associated with said wireless link.

2. The system of claim 1, wherein said current retransmission rate quality factor is determined based, at least in part, on a maximum expected retransmission rate associated with said wireless link, wherein said maximum expected retransmission rate is determined as a function of received signal strength (RSSI) by said end station.

3. The system of claim 1, wherein:
   (i) said current usage quality factor is determined based, at least in part, on a measure of overlapping basic service set (OBSS) load within said shared medium; and
   (ii) said current interference quality factor is determined based, at least in part, on a measure of interference over said shared medium.

4. The system of claim 1, wherein said one or more quality factors associated with said wireless link further include a failure rate quality factor which is determined based, at least in part, on a number of times that a packet is retransmitted over said wireless link without receiving an acknowledgment (ACK) message in return within a specified period of time.

5. The system of claim 1, wherein said program instructions are further executable to determine an operational status of said wireless link based, at least in part, on said overall quality rating relative to a predetermined threshold.

6. The system of claim 5, wherein said program instructions are further executable to determine a cause of said operational status as one of said end station or and said wireless link, based, at least in part, on the relative values of said one or more quality factors.

7. A computer-implemented method comprising:
   monitoring data traffic between an access point and an end station over a wireless link within a wireless communications network;
   deriving, based on said monitoring, one or more of the following quality factors associated with said wireless link:
      (i) a current retransmission rate quality factor over said wireless link,
      (ii) a current physical layer (PHY) rate quality factor of said wireless link, determined based, at least in part, on a maximum expected PHY rate associated with said wireless link, wherein said maximum expected PHY rate is determined as a function of received signal strength (RSSI) by said end station,
      (iii) a current usage quality factor associated with a shared medium used by said wireless link, and
      (iv) a current interference quality factor associated with said shared medium;
   calculating, based on said derived one or more quality factors, a maximum predicted data rate associated with said wireless link; and
   determining an overall quality rating of said wireless link as equal to the ratio between (x) said calculated maximum predicted data rate, and (y) a maximum theoretical data rate associated with said wireless link, determined based, at least in part, on said maximum expected PHY rate associated with said wireless link.

8. The method of claim 7, wherein: said current retransmission rate quality factor is determined based, at least in part, on a maximum expected retransmission rate associated with said wireless link, wherein said maximum expected retransmission rate is determined as a function of received signal strength (RSSI) by said end station.

9. The method of claim 7, wherein:
   (i) said current usage quality factor is determined based, at least in part, on a measure of overlapping basic service set (OBSS) load within said shared medium; and
   (ii) said current interference quality factor is determined based, at least in part, on a measure of interference over said shared medium.

10. The method of claim 7, wherein said one or more quality factors associated with said wireless link further include a failure rate quality factor which is determined based, at least in part, on a number of times that a packet is retransmitted over said wireless link without receiving an acknowledgment (ACK) message in return within a specified period of time.

11. The method of claim 7, further comprising determining an operational status of said wireless link based, at least in part, on said overall quality rating relative to a predetermined threshold.

12. The method of claim 11, further comprising determining a cause of said operational status as one of said end station or and said wireless link, based, at least in part, on the relative values of said one or more quality factors.

13. A computer program product comprising a non-transitory computer-readable storage medium having program instructions embodied therewith, the program instructions executable by at least one hardware processor to:
- monitor data traffic between an access point and an end station over a wireless link within a wireless communications network;
- derive, based on said monitoring, one or more of the following quality factors associated with said wireless link:
  (i) a current retransmission rate quality factor over said wireless link,
  (ii) a current physical layer (PHY) rate quality factor of said wireless link, determined based, at least in part, on a maximum expected PHY rate associated with said wireless link, wherein said maximum expected PHY rate is determined as a function of received signal strength (RSSI) by said end station,
  (iii) a current usage quality factor associated with a shared medium used by said wireless link, and
  (iv) a current interference quality factor associated with said shared medium;
- calculate, based on said derived one or more quality factors, a maximum predicted data rate associated with said wireless link; and
- determine an overall quality rating of said wireless link as equal to the ratio between (x) said calculated maximum predicted data rate, and (y) a maximum theoretical data rate associated with said wireless link, determined based, at least in part, on said maximum expected PHY rate associated with said wireless link.

14. The computer program product of claim 13, wherein: said current retransmission rate quality factor is determined based, at least in part, on a maximum expected retransmission rate associated with said wireless link, wherein said maximum expected retransmission rate is determined as a function of received signal strength (RSSI) by said end station.

15. The computer program product of claim 13, wherein:
  (i) said current usage quality factor is determined based, at least in part, on a measure of overlapping basic service set (OBSS) within said shared medium; and
  (ii) said current interference quality factor is determined based, at least in part, on a measure of interference over said shared medium.

16. The computer program product of claim 13, wherein said one or more quality factors associated with said wireless link further include a failure rate quality factor which is determined based, at least in part, on a number of times that a packet is retransmitted over said wireless link without receiving an acknowledgment (ACK) message in return within a specified period of time.

17. The computer program product of claim 13, wherein said program instructions are further executable to determine an operational status of said wireless link based, at least in part, on said overall quality rating relative to a predetermined threshold.

\* \* \* \* \*